United States Patent [19]

Ochi

[11] Patent Number: 5,083,052
[45] Date of Patent: Jan. 21, 1992

[54] ELECTRIC FAN MOTOR AND A METHOD FOR PRODUCING THE SAME

[75] Inventor: Joji Ochi, Misima, Japan

[73] Assignee: Daikin Industries, Ltd., Osaka, Japan

[21] Appl. No.: 590,968

[22] Filed: Oct. 1, 1990

[30] Foreign Application Priority Data

Oct. 2, 1989 [JP] Japan .................. 1-258413

[51] Int. Cl.⁵ ............... H02K 15/12; H02K 9/06; H02K 15/03
[52] U.S. Cl. ...................... 310/64; 310/44; 310/271; 29/598
[58] Field of Search ............ 310/42, 43, 44, 64, 310/DIG. 6, 154, 156, 271; 29/596, 598

[56] References Cited

U.S. PATENT DOCUMENTS

| | | | |
|---|---|---|---|
| 4,320,080 | 3/1982 | Esper et al. | 264/111 |
| 4,434,546 | 3/1984 | Hershberger | 29/598 |
| 4,686,400 | 8/1987 | Fujisaki et al. | 310/67 R |
| 4,689,163 | 8/1987 | Yamashita et al. | 252/62.54 |
| 4,773,829 | 9/1988 | Vettori | 417/366 |
| 4,810,572 | 3/1989 | Ooe et al. | 428/323 |
| 4,845,837 | 7/1989 | Lloyd | 29/598 |
| 4,934,041 | 6/1990 | Hoover et al. | 29/596 |
| 4,939,398 | 7/1990 | Lloyd | 310/156 |

FOREIGN PATENT DOCUMENTS 0023712  2/1980  Japan .................. 310/156
1-41696  2/1989  Japan .

Primary Examiner—Steven L. Stephan
Assistant Examiner—Dennis R. Haszko

[57] ABSTRACT

An electric rotary machine such as a motor has a rotor having a plurality of poles, a stator having a plurality of poles confronting the poles of the rotor in a radial direction, and a casing, for the rotor, having a cylindrical portion which extends in an axial direction. A permanent magnet composed of a mixed material of magnetic powder and a binder being a thermosetting resin constitutes the poles of the rotor. The permanent magnet, which is ring-shaped, is mounted in the casing along an inner circumference of the cylindrical portion of the casing in a circumferential direction. A yoke member is mounted around an outer circumference of the cylindrical portion of the casing, and a plurality of openings penetrate the cylindrical portion and the yoke member at the same time. The permanent magnet has a plurality of projections monolithically formed on its outer circumference. The projections are fitted in the respective openings in the yoke member and cylindrical portion.

13 Claims, 24 Drawing Sheets

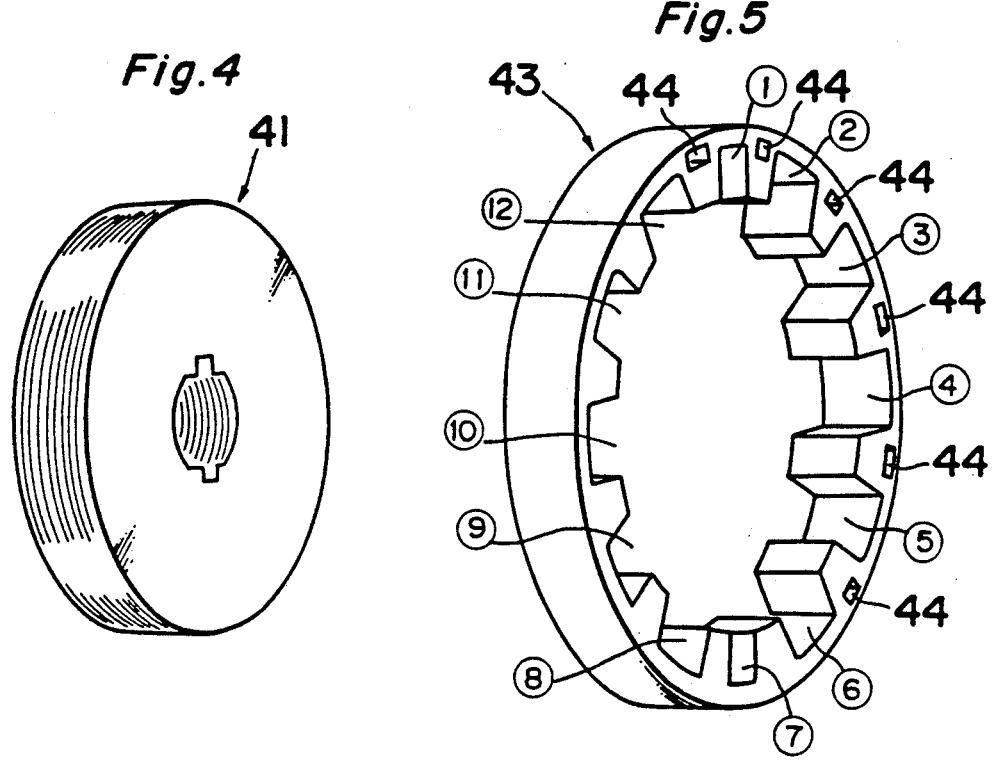
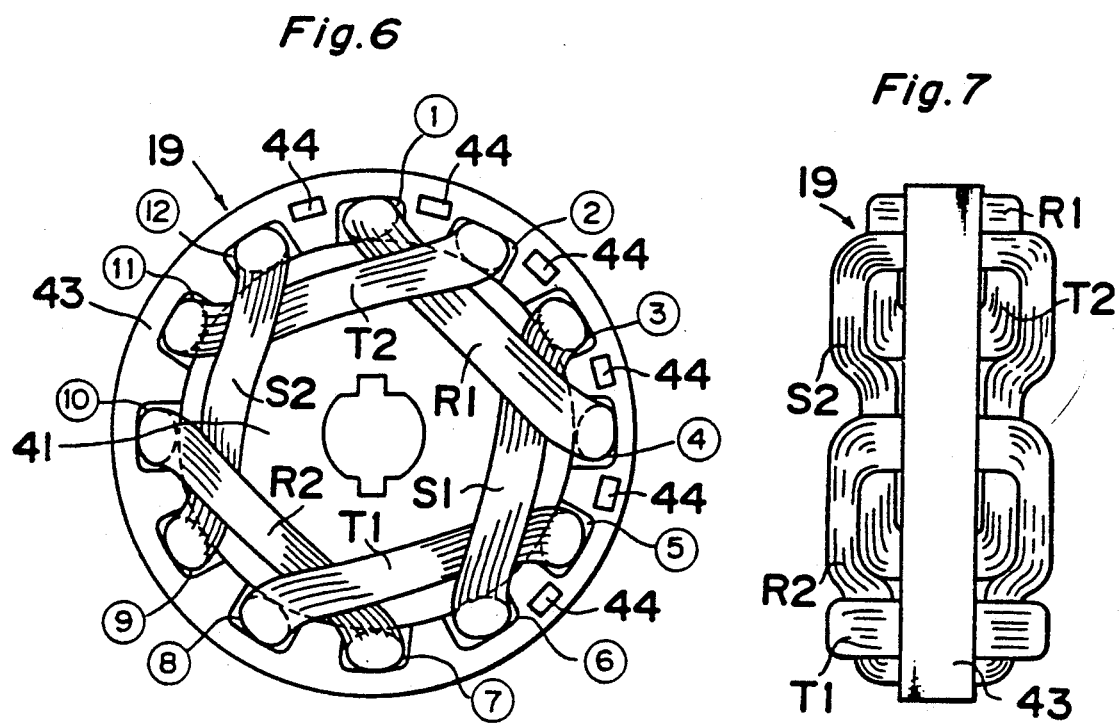

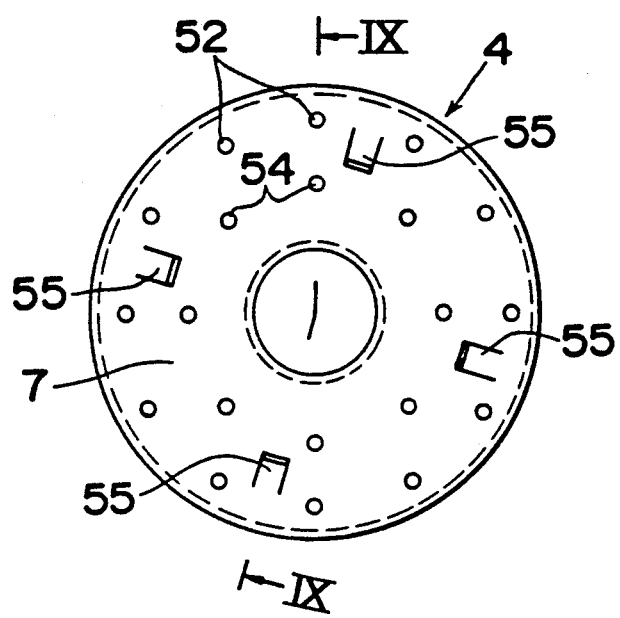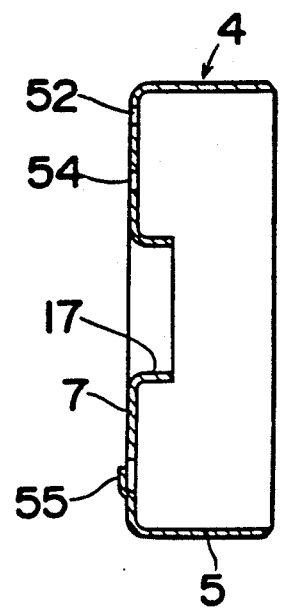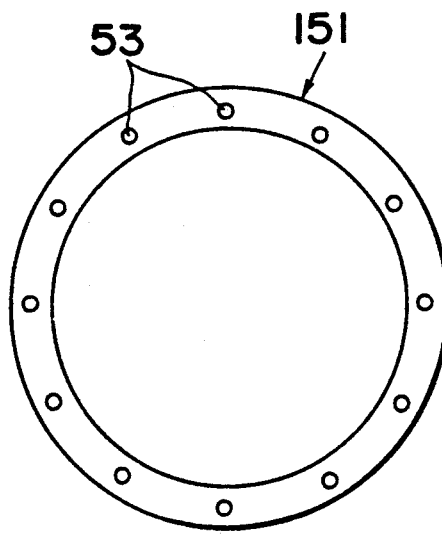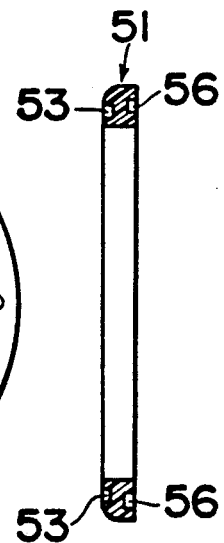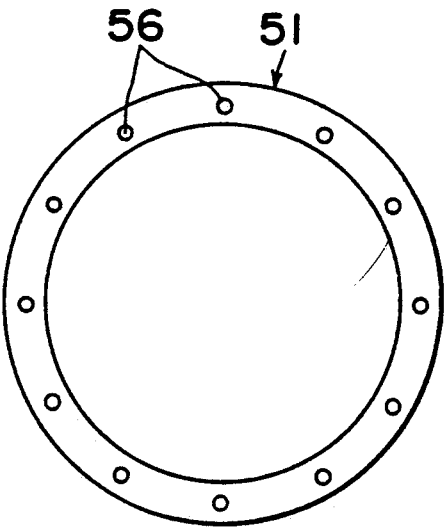

Fig.13A
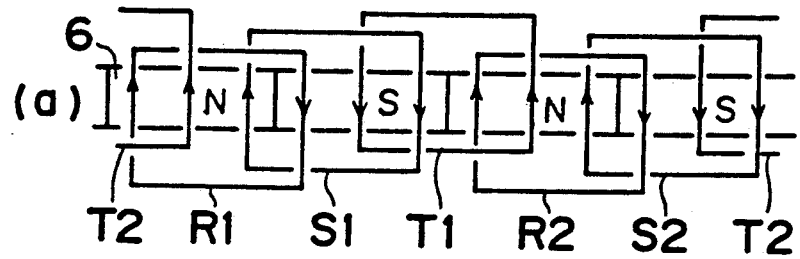
(a)
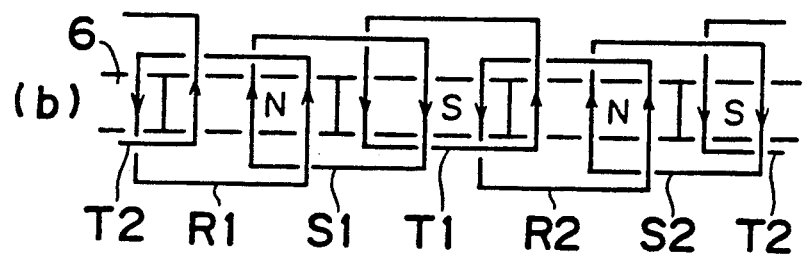
(b)
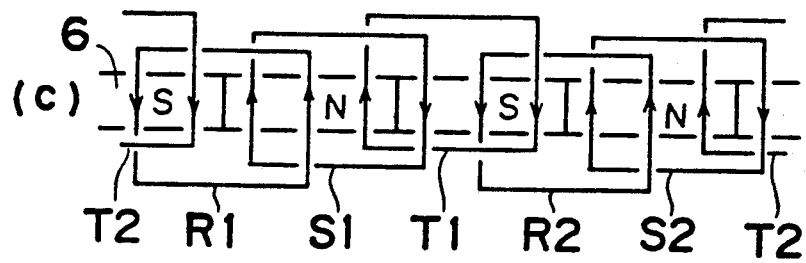
(c)
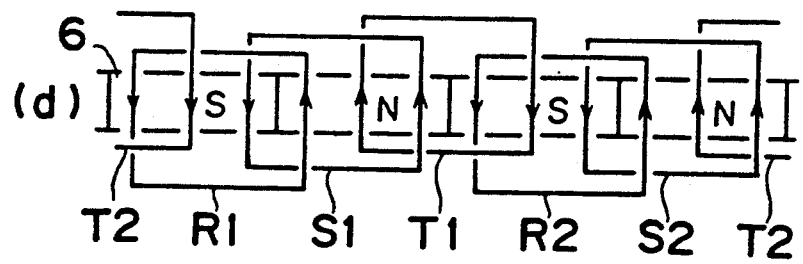
(d)
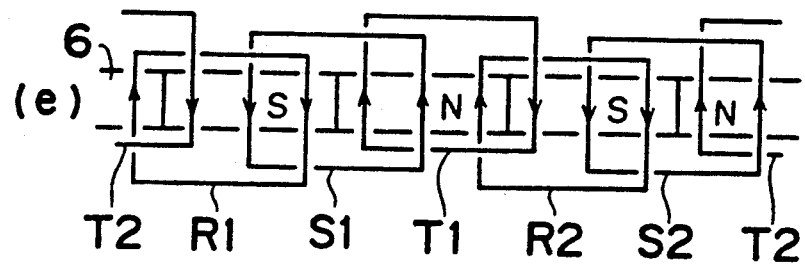
(e)

Fig.13B
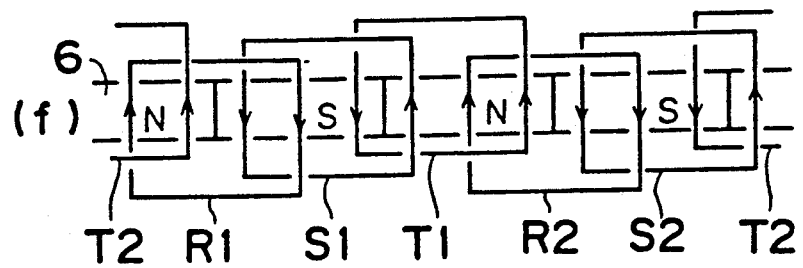
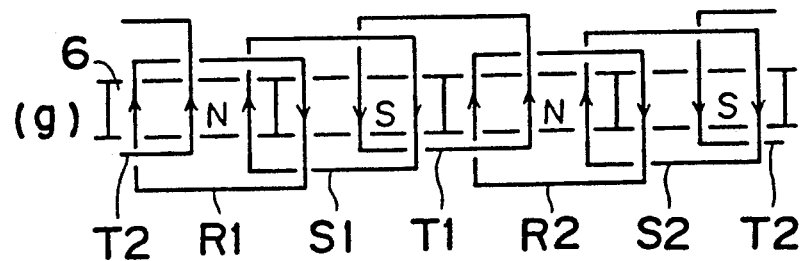
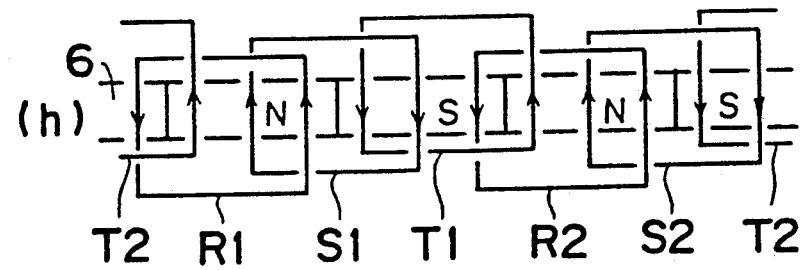
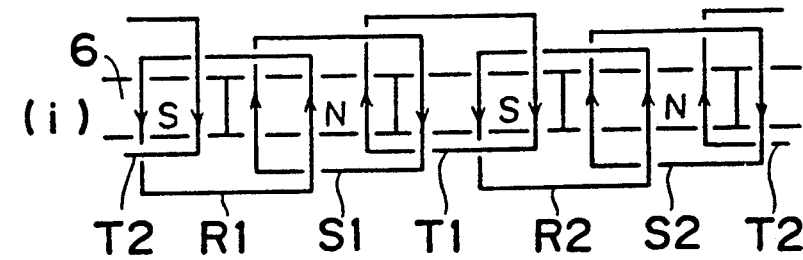
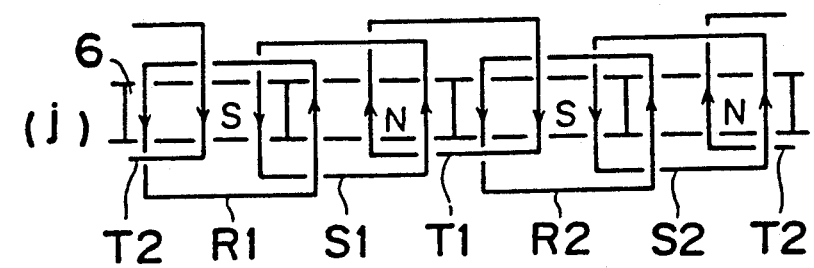

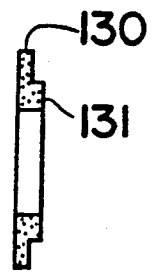
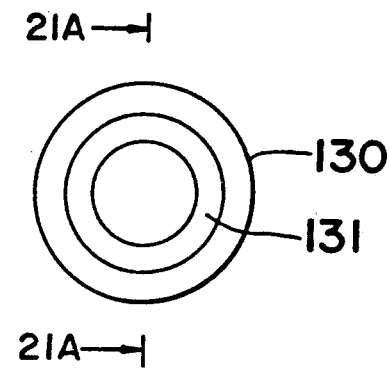
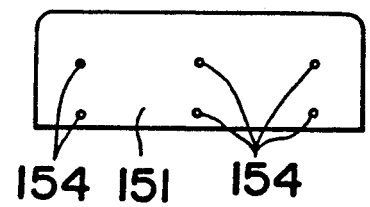
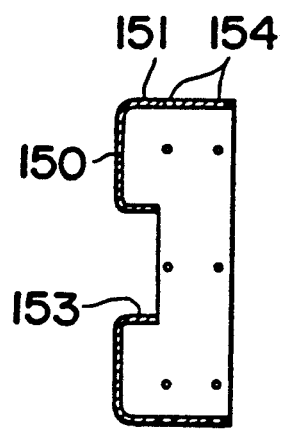
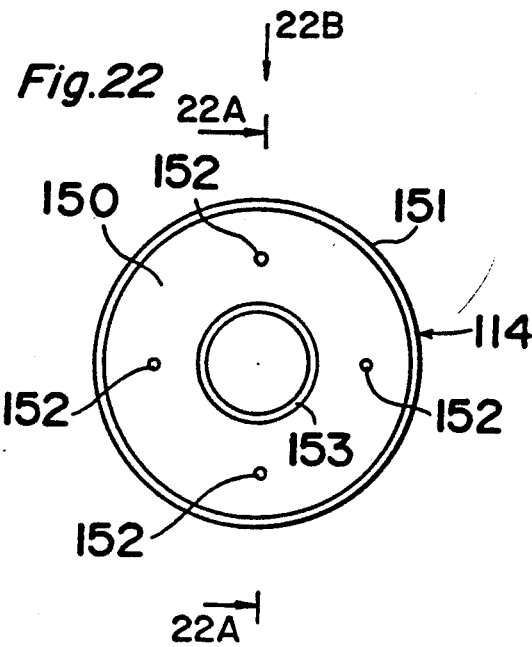

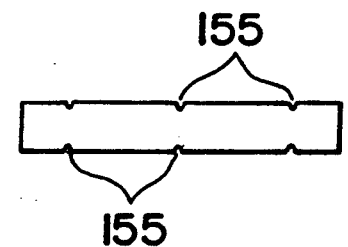
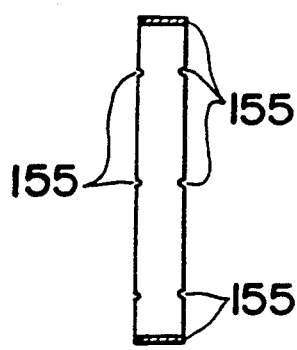
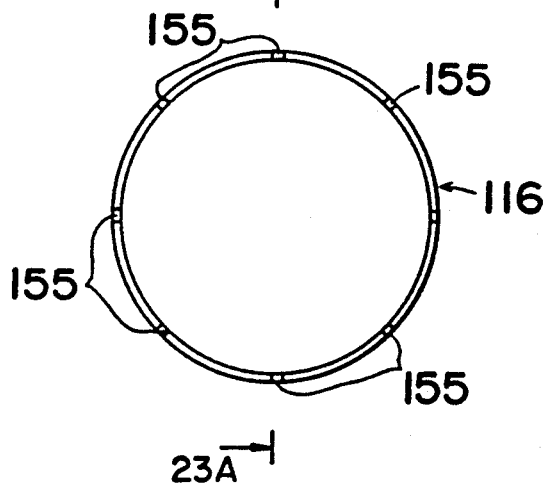
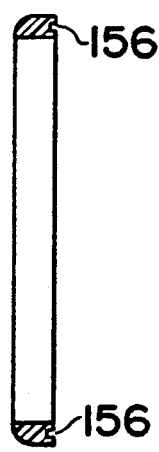
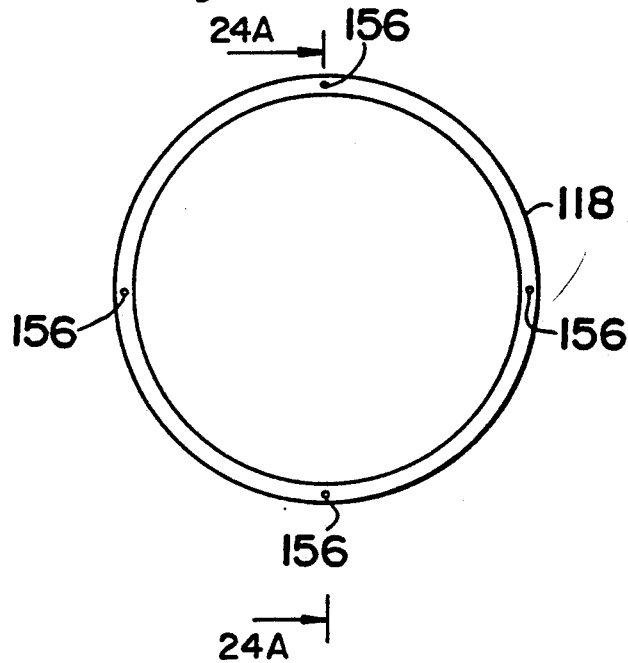

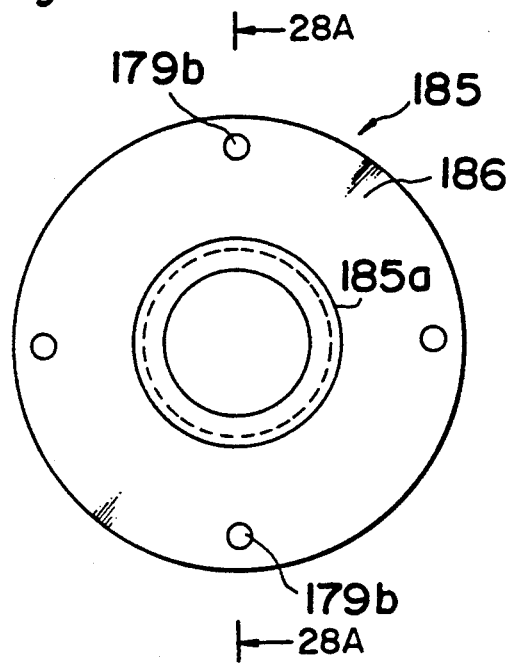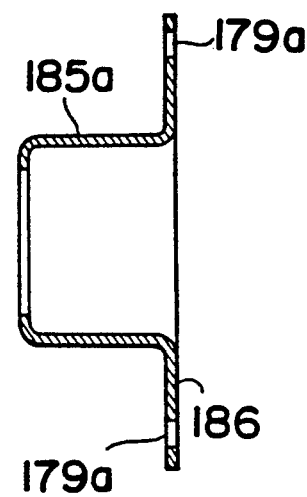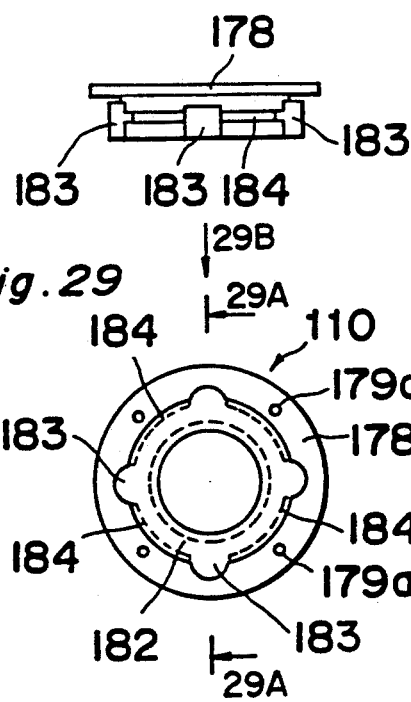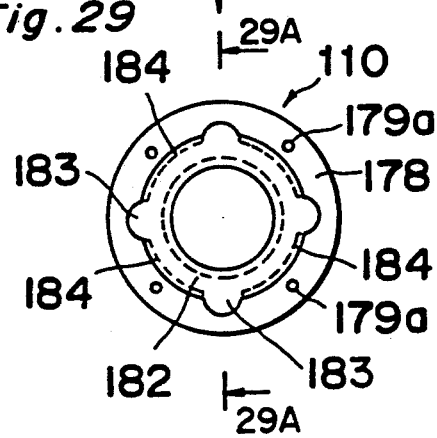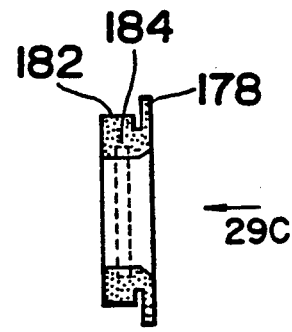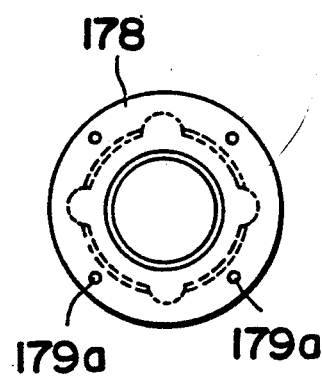

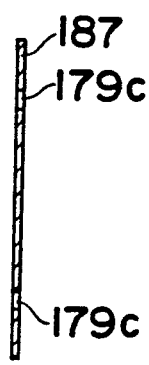
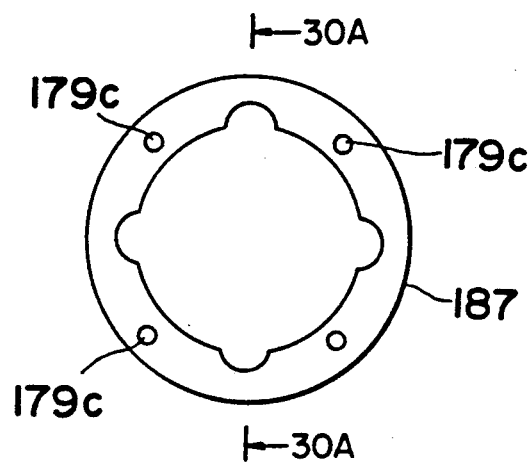
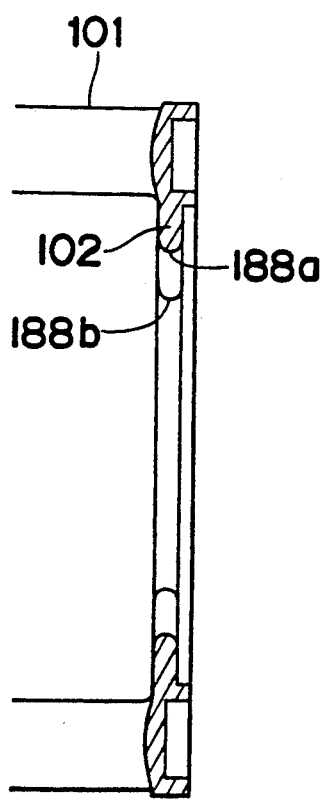
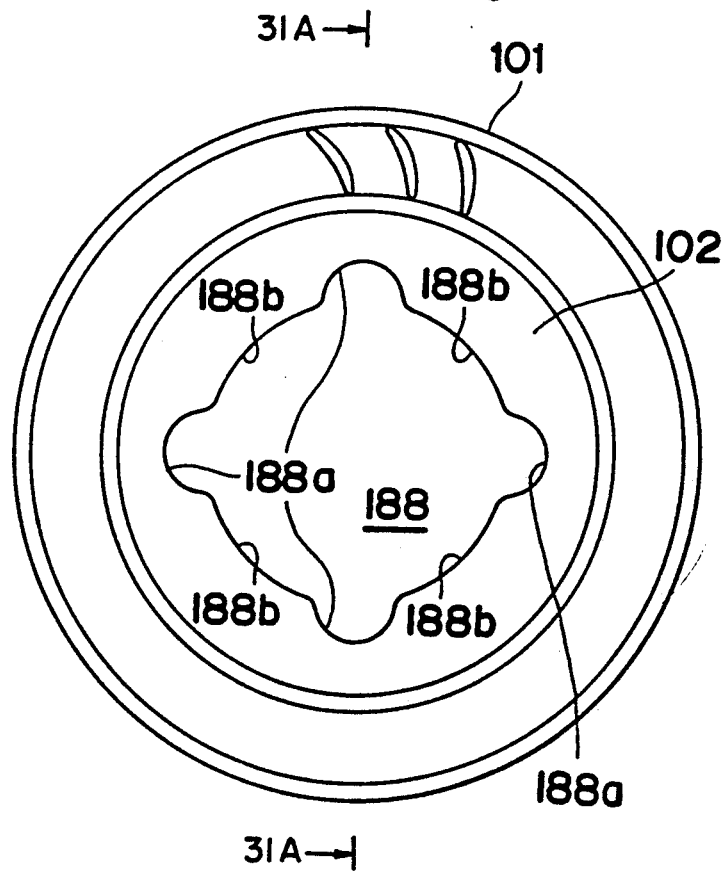

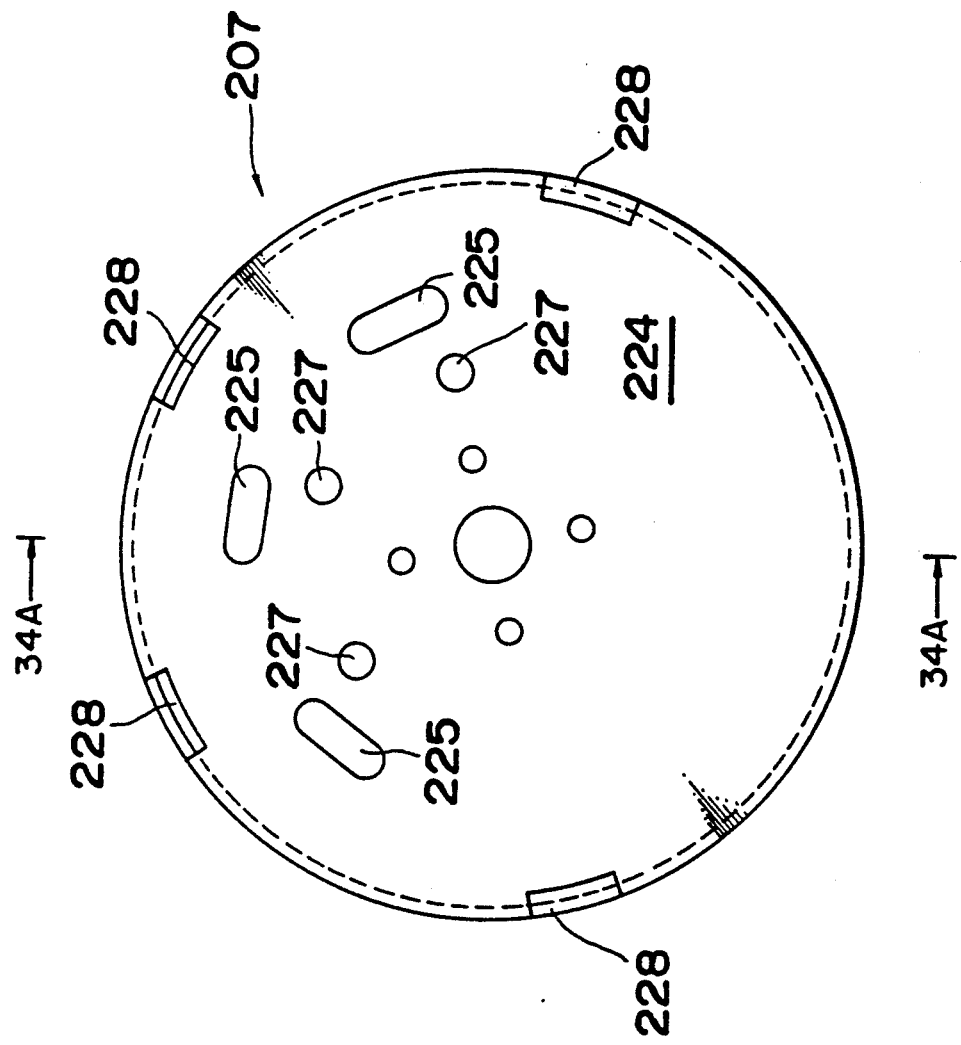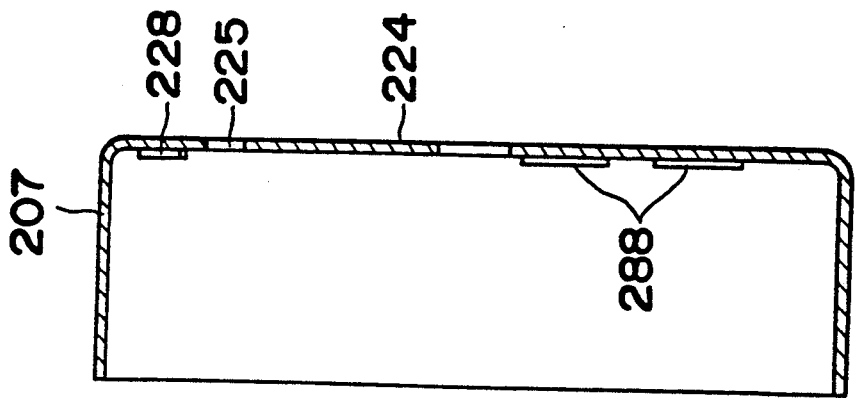

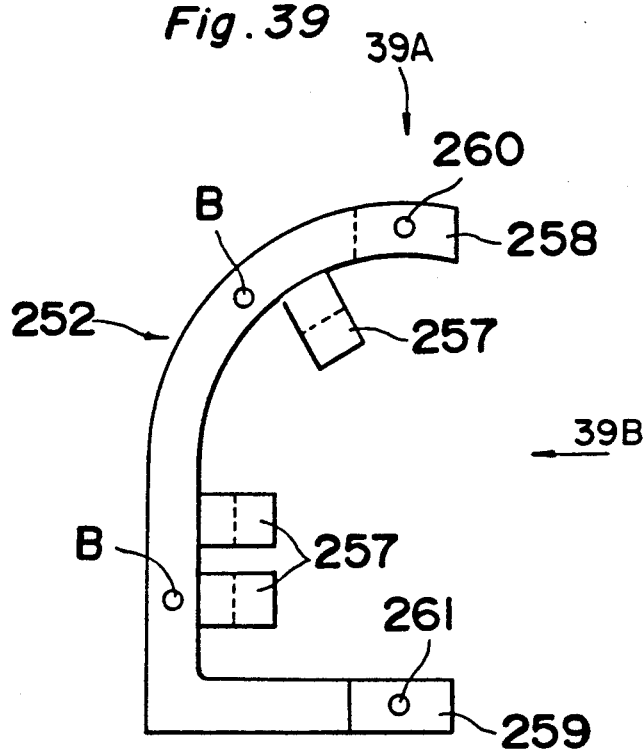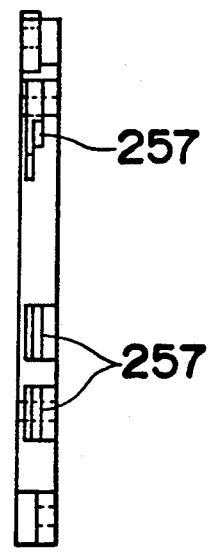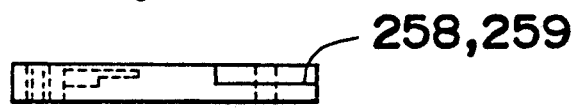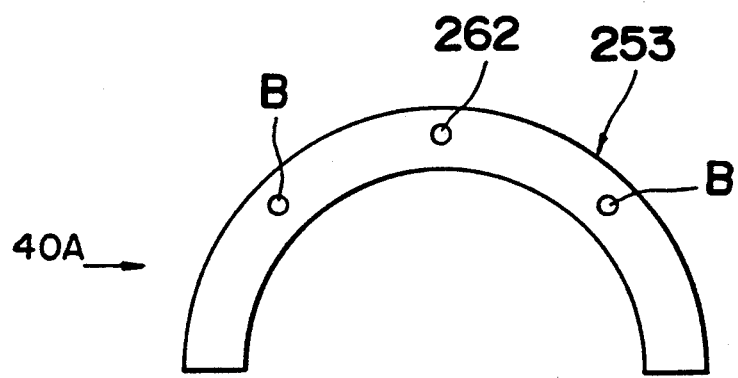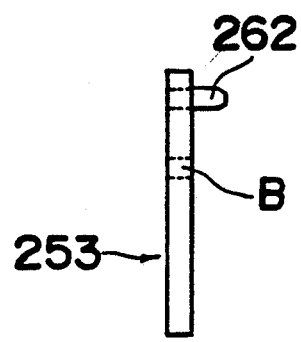

ELECTRIC FAN MOTOR AND A METHOD FOR PRODUCING THE SAME

BACKGROUND OF THE INVENTION

The present invention relates to electric rotary machines such as electric motors and electric generators, and a method for producing the electric rotary machines.

Conventionally, electric rotary machines such as electric motors, for example, have been manufactured as units. For this reason, an indoor unit of an air conditioner, for example, requires a space for receiving a separate motor such as an alternating-current induction motor to drive a cross-flow fan in the indoor unit. As a result, the indoor unit is apt to be of a large size. In other words, separate electric rotary machines cause apparatuses for accommodating the rotary machines to be largesized.

Recently, direct current (DC) brushless motors have been adopted to reduce the size of apparatuses. An apparatus adopting a DC brushless motor is disclosed in the Japanese Patent Application Laid-open Publication No. 64-41696. In the apparatus, a generally cup-shaped casing for a rotor in the DC brushless motor is connected to a side plate of a fan rotor of a cross-flow fan, and a permanent magnet which is fitted along an inner peripheral surface of the casing surrounds a stator.

Conventionally, the permanent magnet is produced by the following method. First, a molded piece of a desired shape is made by sintering a magnetic material such as ferrite. Then, the molded piece is finished so that it has a shape to fit the inner circumferential surface of the casing. The finished molded piece is then placed in the casing.

The molded piece of such magnetic material is very hard and fragile. For this reason, generally, an abrasive finishing is applied to the molded piece as a finishing method. In this case, the production cost becomes high. In addition, it is not easy to make holes in the molded piece for fixing the molded piece to the casing. Therefore, in order to mount the molded piece to the casing, separate articles to help the fixing are required, or an adhesive-assembly is done. This makes the assembly operation complicated and troublesome.

SUMMARY OF THE INVENTION

An object of the present invention is, therefore, to provide a method for producing electric motors which offers a good efficiency in the assembly operation and by which the electric motors can be produced at a low cost.

Another object of the present invention is to provide an electric rotary machine and a method for producing the same in which the number of steps of the production process can be reduced.

In order to accomplish the first object, in a method for producing an electric motor wherein a casing made of a magnetic material for either a rotor or a stator includes a mounting area perpendicularly intersecting a rotary shaft, and a cylindrical portion axially extending from an outer edge of the mounting area, and wherein an annular permanent magnet is circumferentially disposed along an inner circumferential surface of the cylindrical portion, the method according to an embodiment of the present invention has the following steps of:

(a) pouring a mixture of magnetic powder and a binder into the casing;

(b) compression-molding the mixture into an annular shape fitting the inner circumferential surface of the cylindrical portion to form a molded piece;

(c) curing the binder in the molded piece; and (d) magnetizing the molded piece to form a permanent magnet.

According to the production method having the above steps, an annular molded piece is obtained along the inner circumference of the cylindrical portion of the casing of the rotor or of the stator by compression-molding the mixed material of magnetic powder and a binder in the casing. This molded piece in the casing constitutes a permanent magnet preliminarily fixed to the casing. Accordingly, process such as the abrasive finishing of the molded piece into a shape fitting the inner circumferential surface of the casing, the mounting of the molded piece to the casing, etc., which process has been required in the conventional method, is not required. As a result, the production cost is reduced, as compared with the conventional method.

Preferably, the method of the present invention further has the steps of:

(e) forming a separating member composed of a non-magnetic material for magnetically separating the mounting area from the permanent magnet;

(f) forming concave or convex engagement portions on an end face of the separating member; and (g) mounting the separating member to the mounting area in a manner that the other end face of the separating member is in contact with the mounting area.

The above pouring and compression-molding steps (a) and (b) follow the mounting step (g) to provide an end face of the molded piece with a configuration fitting the engagement portions of the separating member.

In this case, because the separating member, which cuts off the leakage of magnetic flux via the mounting area of the casing, has engagement portions on its end face not confronting the mounting area, an end face of the molded piece is given a shape to engage with the engagement portions of the separating member. Therefore, the permanent magnet is positioned fixedly relative to a circumferential direction so that the idling of the permanent magnet in the casing does not occur. As understood from the above, because the separating member is used also for fixing the permanent magnet, additional articles for fixing the permanent magnet to prevent it from idling are not required, and a motor having a simpler construction is obtained. In addition, the number of steps in the production process is reduced.

Furthermore, it is preferable to form convex or concave molding portions on a molding surface of a compression mold for shaping an end face in an axial direction of the permanent magnet so that portions for mounting counter balances are formed on said end face of the permanent magnet.

In this case, additional articles and work for mounting counter balances are not required and therefore the number of steps in the production process is further reduced.

An electric rotary machine according to an embodiment of the present invention has a rotor having a plurality of poles; a stator having a plurality of poles confronting the poles of the rotor in a radial direction; a permanent magnet which is composed of magnetic powder and a binder being a thermosetting resin and which constitutes either the poles of the rotor or the poles of the stator; a casing having a cylindrical portion which extends in an axial direction for accommodating the permanent magnet along an inner circumference of the cylindrical portion in a circumferential direction; a yoke member which is mounted around an outer circumference of the cylindrical portion of the casing; a plurality of openings which penetrate the cylindrical portion and the yoke member at the same time; and a plurality of projections to be fitted in the openings, the projections being monolithically formed on an outer circumference of the permanent magnet.

In a method for producing an electric rotary machine wherein poles provided in a rotor confront poles provided in a stator, and either the poles of the rotor or the poles of the stator are constituted from a permanent magnet, the method according to the present invention has the following steps of:

(a) forming a casing for the rotor or the stator so that the casing has a cylindrical portion extending in an axial direction for mounting the permanent magnet;

(b) forming a plurality of openings in the cylindrical portion and a yoke member to be fitted around the cylindrical portion;

(c) arranging the cylindrical portion of the casing and the yoke member so that the openings of the cylindrical portion and the openings of the yoke member are radially aligned when the yoke member is mounted around the cylindrical portion;

(d) pouring a mixture of magnetic powder and a binder inside the cylindrical portion along an inner surface of the cylindrical portion as well as in the openings;

(e) compression-molding the mixture to form a molded piece;

(f) curing the binder; and (g) magnetizing the molded piece to form a permanent magnet.

According to the electric rotary machine and the production method with the above construction of the present invention, while the permanent magnet is being molded, the projections which are monolithically formed on the permanent magnet are inserted in the openings of the cylindrical portion and of the yoke member so that the permanent magnet is stopped from rotating relative to the cylindrical portion. In addition, the yoke member is monolithically fixed to the cylindrical portion during the molding of the permanent magnet. Namely, an operation for fixing the permanent magnet and the yoke member to the casing can be made easily and securely. As a result, the number of steps of the production process can be made less than that of the conventional production process.

Preferably, the casing is made of a nonmagnetic material, and the method further has the steps of:

(h) forming a vertical mounting area to continue from the cylindrical portion in a manner that the vertical mounting area intersects a shaft substantially at right angles; and (i) fitting a generally ring-shaped nonmagnetic spacer onto an inner surface of the vertical area so that an outer circumferential surface of the spacer is in contact with an inner circumferential surface of the cylindrical portion of the casing.

The step (i) of fitting precedes the step (d) of pouring.

According to this method, the mounting of the spacer for preventing leakage of the magnetic flux can be easily performed. It is therefore possible to readily produce an electric rotary machine which can prevent magnetic flux from the permanent magnet from being leaked through the casing of a magnetic material because of the presence of the spacer covering the mounting area.

A further object of the present invention is, in a fan apparatus wherein a circuit board equipped with heat generation elements such as power transistors is mounted to an end bracket by means of clips, to lessen the number of clips and to improve heat release efficiency of the heat generation elements.

In order to accomplish this object, in a fan apparatus having a fan motor, an end bracket for supporting the fan motor, and a circuit board equipped with heat generation elements and disposed in opposition to the end bracket, according to the present invention, the heat generation elements are disposed in a peripheral portion of the circuit board, a heat release surface of each heat generation element is in contact with the end bracket, elastic members are disposed between the end bracket and the respective heat generation elements, and clamping members made of generally U-shaped elastic pieces are provided to clamp the end bracket and the circuit board so that the heat release surfaces of the heat generation elements are held in close contact with the end bracket.

According to the fan device with the above construction, the end bracket and the circuit board are clamped by elastic force of the clamping members under the condition that the elastic members are interposed between the heat generation elements and the circuit board, thereby the heat release surfaces of the heat generation elements are closely attached to the end bracket. For this reason, the clamping members permit the plural heat release surfaces to entirely and uniformly adhere to the end bracket by pressing the whole circuit board toward the end bracket. Accordingly, it is not necessary to provide clamping members which correspond individually to the heat generation elements. In other words, the number of the clamping members can be smaller than that of the heat generation elements, though the same number of clamping members have been used before.

When the heat release surfaces of the heat generation elements are pressed onto the end bracket by the clamping members, elastic force of the elastic members acts such that the whole of the heat generation elements adheres to the end bracket. Accordingly, pressing force acting on the heat generations elements is made uniform. Specifically, the pressing force acts on the heat generation members not locally but entirely. This results in improved adhesion of the heat generation elements to the end bracket and improved heat release of the heat generation elements.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a perspective view of an iron core of a stator of the electric motor;

FIG. 5 is a perspective view of a slot member of the stator;

FIG. 6 is a front view of the stator;

FIG. 7 is a left-hand side elevation of the stator;

FIG. 8 is a front view of a casing for a rotor of the electric motor;

FIG. 9 is a cross sectional view taken along the line IX—IX of FIG. 8;

FIG. 10 is a longitudinal sectional view of a spacer ring in the rotor;

FIG. 11 is a left-hand side elevational view of the spacer ring;

FIG. 12 is a right-hand side elevational view of the spacer ring;

FIG. 13A and FIG. 13B are diagrams for explaining how to energize magnetic coils in the electric motor with respect to the direction in which electric current flows;

FIG. 21 is a side elevation of a washer;

FIG. 21A is a cross sectional view taken along the line A—A of FIG. 21;

FIG. 22 is a side elevation of a casing;

FIG. 22A is a cross sectional view taken along the line A—A of FIG. 22;

FIG. 22B is a view taken in the direction of the arrow B of FIG. 22;

FIG. 23 is a side elevation of a yoke member;

FIG. 23A is a cross sectional view taken along the line A—A of FIG. 23;

FIG. 23B is a view taken in the direction of the arrow B of FIG. 23;

FIG. 24 is a side elevation of a spacer;

FIG. 24A is a longitudinal mid-sectional view of FIG. 24;

FIG. 28 is a plan view of a coupling hub;

FIG. 28A is a cross sectional view taken along the line A—A of FIG. 28;

FIG. 29 is a side elevation of a flexible joint;

FIG. 29A is a cross sectional view taken along the line A—A of FIG. 29;

FIG. 29B is a view taken in the direction of the arrow B of FIG. 29;

FIG. 29C is a view taken in the direction of the arrow C of FIG. 29A;

FIG. 30 is a side elevation of a press plate;

FIG. 30A is a cross sectional view taken along the line A—A of FIG. 30;

FIG. 31 is a side elevation of a fan rotor;

FIG. 31A is a cross sectional view taken along the line A—A of FIG. 31;

FIG. 34 is a side elevation of an end bracket;

FIG. 34A is a cross sectional view taken along the line A—A of FIG. 34;

FIG. 39 is a side elevation of a left spacer;

FIG. 39A is a view taken in the direction of the arrow A of FIG. 39;

FIG. 39B is a view taken in the direction of the arrow B of FIG. 39;

FIG. 40 is a side elevation of an upper press plate;

FIG. 40A is a view taken in the direction of the arrow A of FIG. 40;

DETAILED DESCRIPTION OF THE PREFERRED EMBODIMENTS

First Embodiment

This embodiment is of a method for producing an electric motor.

Figure 3:
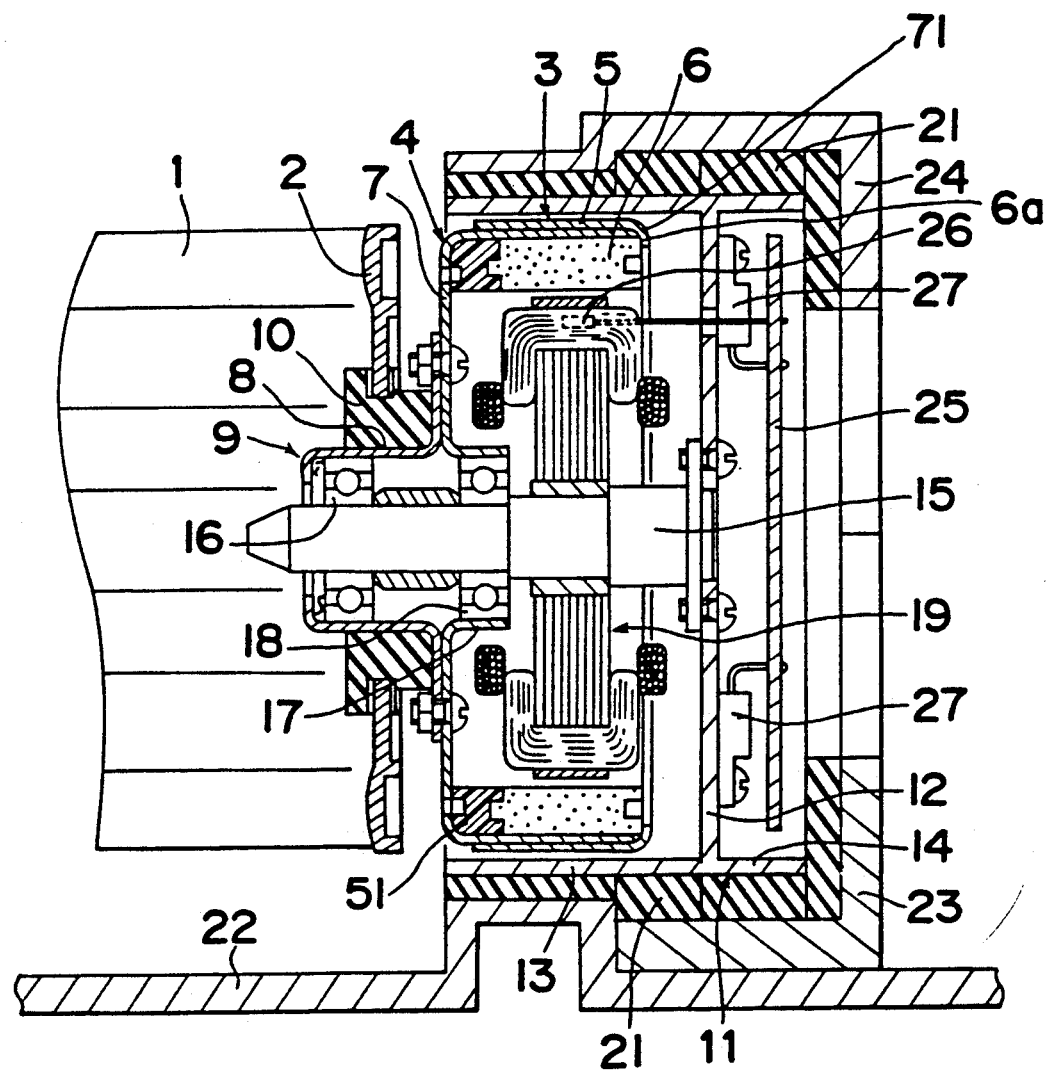
FIG. 3 is a cross sectional view of an essential part of an indoor unit of an air conditioner incorporating an electric motor which is made using the compression mold of FIG. 1.

The following describes a structure of a DC brushless type electric motor for driving a fan to which motor the present invention is applied, with reference to FIG. 3.

FIG. 3 shows a cross sectional view of an essential part of a cross-flow fan assembly installed in an indoor unit of an air conditioner. The motor according to this embodiment is connected to a side plate 2 of a fan rotor 1. In FIG. 3, a reference numeral 3 designates a rotor in the motor. A generally cup-shaped casing 4 for the rotor 3 has a cylindrical portion 5, and a permanent magnet 6 is annularly disposed along an inner circumferential surface of the cylindrical portion 5. To a vertical area (mounting area) 7 opposite the fan rotor 1 of the casing is fixed a coupling hub 9. The coupling hub 9 has a cylindrical expansion portion 8 which projects toward the fan rotor 1. The side plate 2 of the fan rotor 1 has a shaft hole, and a vibration-insulating connector member 10 made of a synthetic rubber or other materials and having also a shaft hole is fitted in the shaft hole of the side plate 2. The expansion portion 8 of the coupling hub 9 is press fitted in the shaft hole of the vibration-insulating connector member 10 so that the rotor 3 is mounted onto the fan rotor 3.

In FIG. 3, a reference numeral 11 indicates an end bracket. The end bracket 11 is constituted from a vertical area 12, a mounting area 13 which is a hollow cylinder which extends from the edge of the vertical area 12 in one direction toward the fan rotor 1, and a shrouding 14 of a small length which extends from the edge of the vertical area 12 in the opposite direction.

A fixed shaft 15 is mounted in a central portion of the vertical area 12 so as to extend toward the fan rotor 1. A tip-side portion of the fixed shaft 15 is inserted in a first bearing 16 and a second bearing 18. The first bearing 16 is fitted in the expansion portion 8 while the second bearing 18 is disposed in a cylindrical bearing container 17 formed by bending a central portion of the vertical area 7 of the casing 4 toward the inside of the casing. Under this assemblage condition, the fixed shaft 15 supports the rotor 3 and the fan rotor 1 such that the rotor 3 and the fan rotor 1 can rotate freely. The rotor 3 is disposed in a space which is surrounded by the mounting area 13 of the end bracket 11. On the other hand, a stator 19 is fixed in the middle of the fixed shaft 15, and an outer circumference of the stator 9 confronts an inner circumference of the permanent magnet 6. The structure of the rotor 3 and the stator 19 will be described in detail later.

The mounting area 13 and the shrouding 14 of the end bracket 11 are wound with a rubber vibration insulator 21 before the end bracket 11 is placed in a motor casing which is constituted from a lower motor casing 23 fixed to a frame 22 of the indoor unit, and an upper rotor casing 24 screwed on the lower motor casing 23. In this assemblage state, the screw fastening force acts on the end bracket 11 as a pressing force via the rubber vibration insulator 21 so that the bracket is fixed.

A circuit board 25 having a control circuit for the DC brushless motor is contained in a space surrounded by the shrouding 14. The circuit board 25 has Hall elements 26 extending through the vertical area 12 toward the stator 19, power transistors 27, and other electronic elements (not shown) such as a capacitor, electrical resistances, a control IC, etc. Of these electronic elements, tall elements such as the power transistors 27, the capacitor, etc. are mounted in a lying state on the circuit board 25 in order that the circuit board 25 is well contained in the limited space. In addition, the power transistors 27 generating a large amount of heat are mounted in a manner that their respective heat release faces are attached to the vertical area 12 of the end bracket 11 so that the end bracket 11 can function also as a heat release plate for the power transistors 27.

The following describes the stator 19.

A stator iron core 41 formed of a laminated circular electric iron plate is shown in FIG. 4. As shown in FIG. 4, the stator iron core 41 is of a cylindrical shape having no projecting poles around its outer circumference, namely of a slotless type.

A slot member 43 for mounting coils is shown in FIG. 5. The slot member 43 is a ring-shaped piece made of non-magnetic material such as a synthetic resin, for example. An inner diameter of the slot member 43 is almost the same as an outer diameter of the stator iron core 41. Twelve recesses, namely, slots (1)–(12) are formed on an inner circumference of the slot member 43 at regular intervals in an circumferential direction. As shown in FIGS. 6 and 7, coils R1, R2, S1, S2, T1 and T2 are placed in the slots (1)–(12) in a 3-phase, 4-pole, superposed state. After that, the stator iron core 41 is inserted inside the slot member 43 and bonded to the inner circumference of the slot member 43. In this way, the stator 19 is constructed.

As shown in FIG. 6, the slot member 43 has holes 44 for inserting the Hall elements between adjacent slots. Detecting portions of the three Hall elements 26 fitted to the circuit board 25 are inserted in three of the holes 44 which are selected in accordance with a rotating direction of the rotor 3.

The following describes a structure of the rotor 3 and a method for producing the rotor 3.

As shown in FIG. 3, the permanent magnet 6, which is ring-shaped, in the rotor 3 has an outer circumference bonded to the inner circumference of the cylindrical portion 5 of the casing 4. On the other hand, an inner circumferential surface of the permanent magnet 6 surrounds the stator 19, and is magnetized to have four magnetic poles N, S, N and S in that order in the circumferential direction.

The casing 4 is formed of a magnetic material such as a cold-rolled steel plate and functions as a magnetic path member on the outer-circumference side for the permanent magnet 6. In case that an end face of the permanent magnet 6 is in contact with the vertical area 7 of the casing 4, leakage of magnetic flux through the vertical area 7 will occur. In order to avoid this problem, a spacer ring (separating member) 51 made of a non-magnetic material such as a synthetic resin, for example, is interposed between the vertical area 7 and the permanent magnet 6.

The casing 4 is shown in FIG. 8 and 9, and the spacer ring 51 is shown in FIGS. 10–12. As shown in those figures, twelve through-holes 52 are provided in an outer-circumferential portion of the vertical area 7 of the casing 4 at equal intervals. On the other hand, holes 53 for mounting counter balances are provided on an end face contacting the vertical area 7 of the spacer ring 51 in positions corresponding to the through-holes 52 of the vertical area 7. A proper number of the mounting holes 53 are selected and fixing screws are inserted in the selected mounting holes 53 via the through-holes 52. As a result, the spacer ring 51 is mounted onto the casing 4.

As shown in FIG. 8, the vertical area 7 of the casing 4 also has holes 54 for screws used for fixing the coupling hub 9. The vertical area 7 also has engagement projections 55 protruding toward the fan rotor (toward the left in the figure). On the other hand, as shown in FIGS. 10 and 12, the spacer ring 51 is provided with twelve engagement recesses 56 on its other end face which does not confront the vertical area. The function of the engagement projections 55 and the engagement recesses 56 will be described later.

Figure 1:
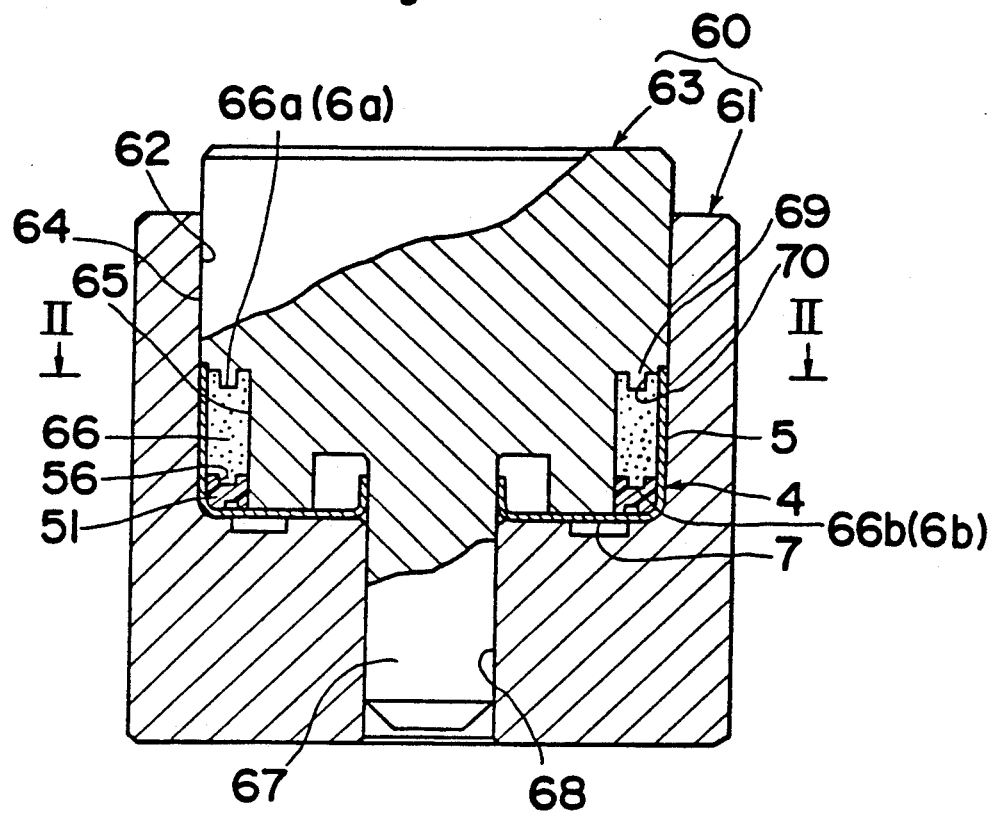
FIG. 1 is a longitudinal sectional view of a compression mold used in a compression-molding process of a motor production method according to a first embodiment of the present invention.

The following describes a production process for the permanent magnet 6 in the casing 4, referring to FIG. 1.

In FIG. 1, a reference numeral 60 indicates a compression mold. The compression mold 60 includes a movable upper die 63 and a fixed lower die 61. In the fixed lower die 61 is formed a recess 62 which consists of a cylindrical surface and a bottom surface. The cylindrical surface and the bottom surface have shapes corresponding to the outer peripheral surfaces of the cylindrical portion 5 and the vertical area 7 of the casing 4, respectively. The casing 4 fitted with the spacer ring 51 is placed in the recess 62.

A pasty mixed material of nonmagnetic powder, described later, and a binder such as a thermosetting epoxy resin is prepared and poured onto the spacer ring 51 in the casing 4. After that, the movable upper die 63 is inserted into the fixed lower die 61 and compressed downward in the figure. The movable upper die 63 has a cylindrical guide surface 64 to fit in an inner circumference of the recess 62 of the fixed lower die 61 in its upper part, and a cylindrical molding surface 65 of a diameter substantially identical to an inner diameter of the spacer ring 51 at its middle portion. Accordingly, the mixed material is compression-molded into a shape filling a space between the molding surface 65 and the inner circumference of the cylindrical portion 5 of the casing 4. As a result, a ring-shaped molded piece 66 is obtained along the inner circumference of the cylindrical portion 5.

In order to maintain the concentricity between the movable upper die 63 and the fixed lower die 61 during the compression molding operation, in other words, in order to obtain the molded piece 66 concentric with the casing 4, the movable upper die 62 is provided with a shaft portion 67 of a small diameter extending downward, while the fixed lower die 61 is provided with a through-hall 68 for receiving the shaft portion 67 to make a concentric positioning.

After the compression molding, the movable upper die 63 is raised. Because the molding surface 65 of the upper die 63 is preliminarily coated with parting agent, the upper die 63 is easily separated from the molded piece 63. Thus, the molded piece 66 remains adhering to the inside of the cylindrical portion 51 of the casing 4. Next, the casing 4 is removed from the compression mold 60 and heated by a stove up to a setting temperature of the binder to set the binder. It is to be noted that the spacer ring 51 is formed of a synthetic resin having heat resistance against a temperature beyond the heating temperature.

The heating and setting process for the binder can be performed in the following manner as well. After the compression molding in the mold 60 is completed, the entire mold 60 is heated to the setting temperature while the compressed state is maintained. In this case, possible deformation occurring during the setting process can be almost avoided.

After the binder setting process, the casing 4 with the molded piece 66 is processed by a magnetizer so that the molded piece 66 is given four magnetic poles N, S, N and S in a circumferential direction to become the permanent magnet 6.

Rare-earth magnetic powder consisting of neodymium, iron and boron is used as the magnetic powder material. Such a permanent magnet made of rare-earth elements has the product of energy 3.6 times as large as that of a ferrite magnet which has been frequently used before, and consequently, can be made much smaller in size to be one-third of a conventional magnet. When an amount of the binder is so small that a surface of the molded piece 66 is sufficiently covered, problems such as peeling, generation of rust, etc occur. On the other hand, when too much binder is mixed, because the product of energy per unit area decreases, and a surface layer increases in thickness, a rotary force decreases as when an air gap between the stator and the permanent magnet increases. For these reasons, a mixture ratio of the binder to the magnetic powder is 5-10% by weight in the present embodiment to prevent such problems from occurring and to make the product of energy per unit area as large as possible.

The following describes the configuration of the molded piece 66 in detail. As shown in FIG. 1, when the compression molding is completed, an end face 66b of the molded piece 66 is given a configuration having projections to be inserted in the recesses 56 of the spacer ring 51. Accordingly, the molded piece 66 is brought into close engagement with the spacer ring 51 with the projections inserted into the recesses 56. That is, a structure which does not cause the molded piece 66, namely, the permanent magnet, to idle relative to the spacer ring 51 is obtained in the compression molding process.

Figure 2:
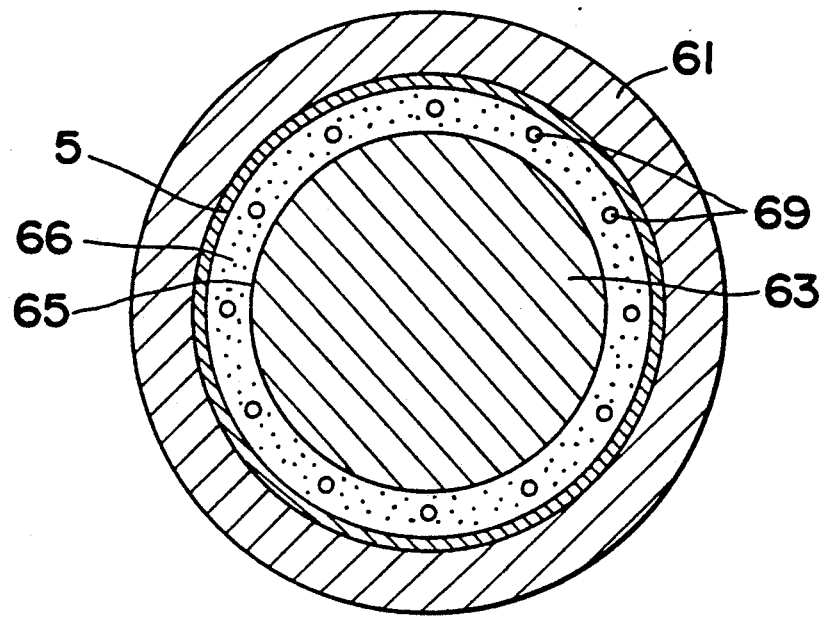
FIG. 2 is a cross sectional view taken along the line II—II of FIG. 1.

On the other hand, as shown in FIGS. 1 and 2, twelve pin-like projections (molding portions) 69 are formed in a step portion formed between the guide surface 64 and molding surface 65 of the movable upper die 63. The step portion shapes the other end face 66a, which is remote from the vertical area 7, of the molded piece 66. The pin-like projections 69 make holes (mounting portions) for mounting counterbalances on the end face 66a of the molded piece 66 during the compression molding process.

After the permanent magnet 6 is produced in the above manner, a cover 71, which has an inner diameter substantially identical with an outer diameter of the cylindrical portion 5 of the casing 4, is put on and fixed to the casing 4, as shown in FIG. 3. A right-hand-side end portion of the cover 71 is bent radially inward. This bend portion covers an entire outer circumferential portion of the end face 6a (66a) of the permanent magnet 6. This structure fixedly positions the permanent magnet 6 in the axial direction to prevent the magnet 6 from falling off from the casing 4. After that, press fitting of the aforementioned second bearing 18 into the bearing container 17 of the casing 4 and mounting of the coupling hub 9 to the vertical area 7 are carried out, thus bringing the rotor 3 to perfection.

The rotor 3 is then checked by a balancing machine about deviation of the center of gravity as a rotating piece. If imbalance is detected, appropriate holes to correct the imbalance are selected from the holes 53 (FIGS. 10-11) formed in the spacer ring 51 and the holes 70 (FIG. 1) formed on the end face 6a of the permanent magnet 6. Balancing weights are screwed in the selected holes.

If the balancing weight is constituted from a mixture of non-magnetic weight powder and a thermosetting resin, part of the weight is inserted in the holes 53, 70 and bonded with adhesive. By so doing, it becomes possible to position the balancing weight more accurately and to join it more strongly.

The following describes the operation of the electric motor with the above structure.

FIGS. 13A and 13B show an example of switching of the energizing direction for each coil in accordance with change in the rotation angle of the rotor 3, that is, move of the permanent magnet 6, to rotate the rotor 3 continuously only in one direction. The change in the rotation angle of the rotor 3 is detected by the Hall elements 26. In accordance with change in output from the Hall elements 26, the energizing direction is switched as follows.

At an initial state, as shown in (a) of FIG. 13A, the slots (1)–(3) and (7)–(9) confront the N-poles of the permanent magnet 6 and the slots (4)–(6) and (10)–(12) confront the S-poles. Under this condition, the R-phase coils R1 and R2 are energized so that electric current flows clockwise in the figure. At that time, if the electric current flows clockwise in the S-phase coils S1 and S2, and counterclockwise in the T-phase coils T1 and T2, force moving the rotor 3 clockwise in the figure is generated from all coils positioned in the slots (1)–(12).

When the rotor 3 is rotated for an interval of 1 slot, that is, 30° (a rotation position (b) in FIG. 13A), the energizing direction for the R-phase coils R1 and R2 is changed to the counterclockwise direction. As the rotor 3 moves, the energizing direction for either of the R-phase coils, S-phase coils and T-phase coils is switched sequentially in accordance with the rotation angle position of the rotor 3 as shown in (c)–(j) of FIGS. 13A and 13B. Thereby, the rotor 3 and the fan rotor 1 connected to the rotor 3 are rotated.

In the structure as described above, the stator iron core 41 has no projecting poles, as shown in FIG. 4, and magnetic flux density in the magnetic path between the stator iron core 41 and the permanent magnet 6 is maintained almost the same in any rotation position of the rotor 3. Therefore, rotation causing no cogging is available.

In contrast with the electric motor with the above structure, in an electric motor wherein a stator iron core has radially projecting poles, if a permanent magnet used in the motor is of the shape of a ring which has a uniform thickness in a radial direction like the permanent magnet of the present embodiment, irregular rotation due to cogging occurs. In this case, the irregular rotation because of cogging can be suppressed by making an air gap between the permanent magnet and the stator in a central portion of each magnetic pole smaller than that in a peripheral portion adjacent to a next pole.

Second Embodiment

Figure 14:
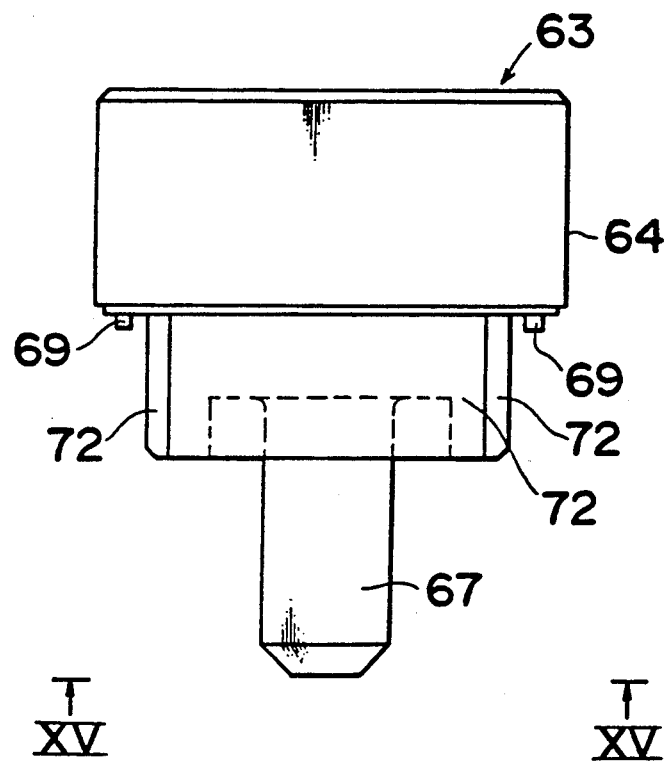
FIG. 14 is a front view of a movable upper die of a compression mold used in a second embodiment of the present invention.
Figure 15:
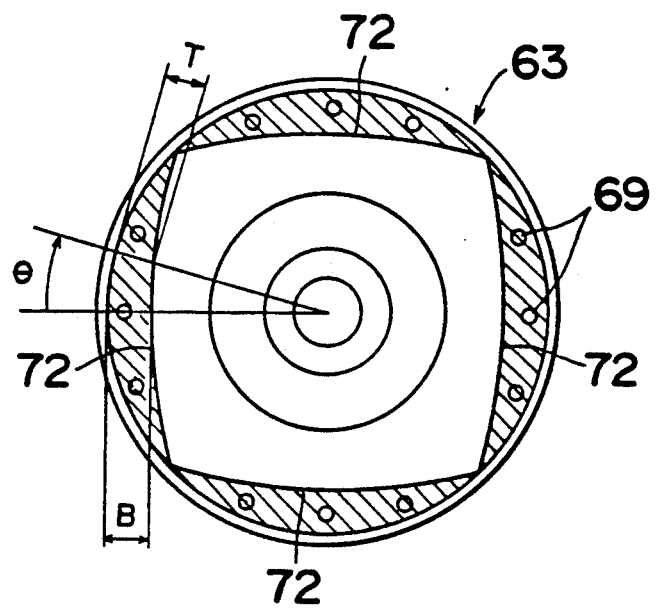
FIG. 15 is a view taken in the direction of the arrows XV of FIG. 14.

FIGS. 14 and 15 show a movable upper die of a compression mold according to a second embodiment. This movable upper die is for forming a permanent magnet having a shape that can suppress the cogging. The second embodiment has the same structure as the first embodiment, except for the movable upper die. Therefore, the same parts are designated by the same numbers and description on those parts is omitted.

A molding surface of the movable upper die 63 is formed of four arc surfaces 72 having a curvature larger than the inner diameter of the cylindrical portion 5 of the casing 4, as shown in FIG. 15. With this movable upper die 63, four molded pieces each having a generally crescent-shaped cross section (hatched in the figure) are formed along the inner circumference of the cylindrical portion 5 of the casing 4. In this case, each arc surface 72 is formed so that the following formula is satisfied.

$$T = B \times \cos 2\theta$$

where B is a thickness in a radial direction in a central position of each molded piece, and T is a thickness in a radial direction in a position apart from the central position for $\theta$ degrees. Each molded piece is magnetized to form a pole. Accordingly, in the electric motor of this embodiment, an air gap between each magnetic pole and the stator is larger in a peripheral portion near a next pole than in a central portion. As a result, rotary drive with less irregularity due to cogging is obtained.

Though in the first and second embodiments, the invention is applied to a DC brushless motor wherein the permanent magnet 6 is provided in the rotor 3, the invention can be also applied to motors of a type wherein the permanent magnet is provided in the stator or of other types.

Third Embodiment

A rotary electric power machine and a method for producing the same will now be described in reference to FIGS. 16–32.

Figure 16:
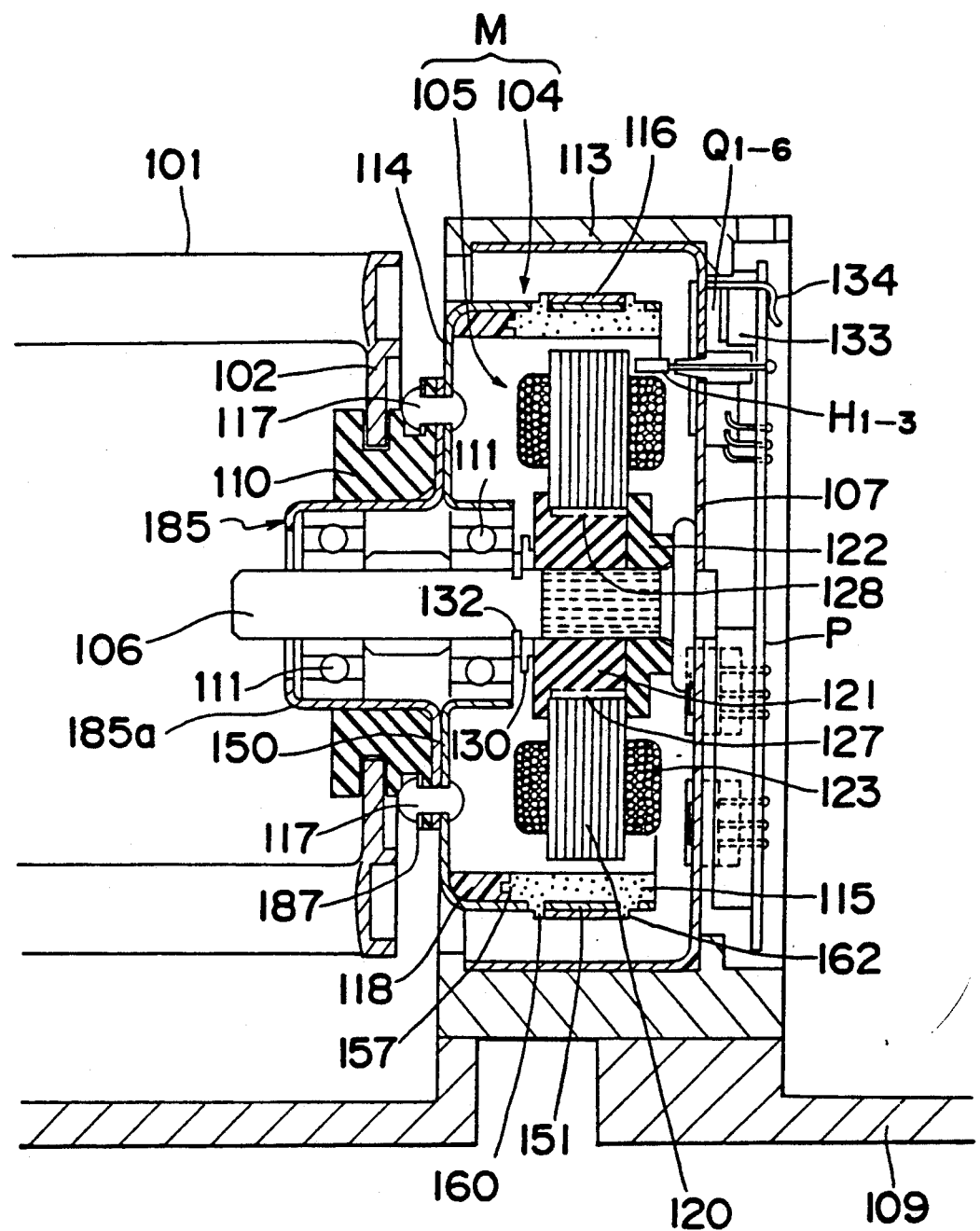
FIG. 16 is a longitudinal sectional view of a motor according to a third embodiment of the present invention.

A structure of a direct current electric motor of a brushless type for driving a fan, which has been manufactured in accordance with the present invention, is described in reference to FIG. 16 which shows a right-side end portion of a cross-flow fan in an indoor unit of an air-conditioner.

In FIG. 16, a fan motor M of a type of a DC brushless motor is connected to a side plate 102 of a fan rotor 101. A rotor 104 of the fan motor M is rotatably supported around a fixed shaft 106 through ball bearings 111, 111. The side plate 102 of the fan rotor 101 is connected with the rotor 104 of the fan motor M through a flexible joint 110 being a rubber vibration insulator. The flexible joint 110, which is formed as shown in FIGS. 29–29C, has a plurality of screw holes 179a in its flange 178. The joint 110 also has projections 183 of a generally semi-circular shape and arc-shaped grooves 184 in its cylindrical portion 182. The flange 178 is tightly fastened to a mounting area 186 which a coupling hub 185, shown in FIGS. 28 and 28A, has. The flange 178 of the flexible joint 110 and the coupling hub 185 are connected to each other as follows. The connection between the flange 178 and the coupling hub 185 is effected by inserting screws 117 into the screw holes 179a of the flange 178, screw holes 179b of the mounting area 186, screw holes 179c of a press plate 187 (FIGS. 30 and 30A), and finally into screw holes 152 (FIG. 22) of a casing 114. One of the ball bearings 111 is disposed in a boss portion 185a of the coupling hub 185 as shown in FIGS. 16.

As shown in FIGS. 31 and 31A, an opening 188 is provided on the side plate 102 of the fan rotor 101. The opening 188 is defined by a plurality of notch portions 188a and inner rim portions 188b. The projections 183 of the flexible joint 110 are fit into the notch portions 188a of the opening 188, and the inner rim portions 188b of the opening 188 are fit into the arc-shaped grooves 184 of the flexible joint 110. In this manner, the flexible joint 110 and the fan rotor 101 are connected to each other.

A stator 105 is fixed around the fixed shaft 106. The stator 105 constitutes the fan motor M together with the rotor 104. The fixed shaft 106 is supported by an end bracket 107 at an end on the right-hand side of the drawing. The end bracket 107 is supported by a cover 113 and a frame 109. These members are adapted to support the fan motor M.

There is disposed a printed circuit board P on the right of the end bracket 107, as described later. The printed circuit board P is provided with six power transistors Q1-Q6 and three Hall elements H1-H3.

The rotor 104 includes the generally cup-shaped casing 114, a permanent magnet 115 disposed along an inner peripheral surface of the casing 114, a spacer 118 for preventing magnet flux from leaking, and a yoke member 116 disposed around an outer peripheral surface of the casing 114. The casing 114, the permanent magnet 115, the spacer 118 and the yoke member 116 are integrally produced during a process of the compression molding, heating and setting of the permanent magnet 115. The casing 114 is connected to the flexible joint 110 with the screws 117, as described above. The rotor 104 will be described later more in detail.

Figure 18:
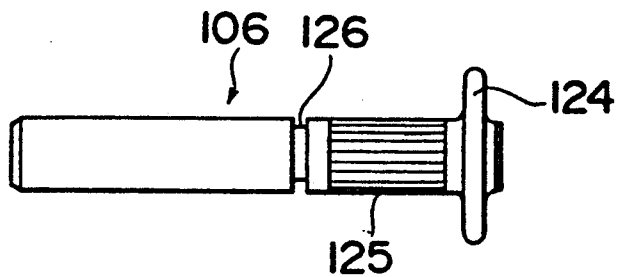
FIG. 18 is a plan view of a fixed shaft.
Figure 19A:
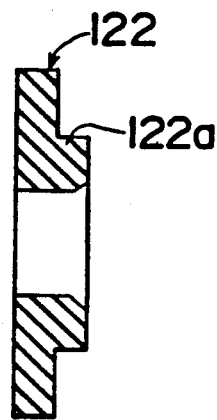
FIG. 19A is a cross sectional view taken along the line A—A in FIG. 4.
Figure 19:
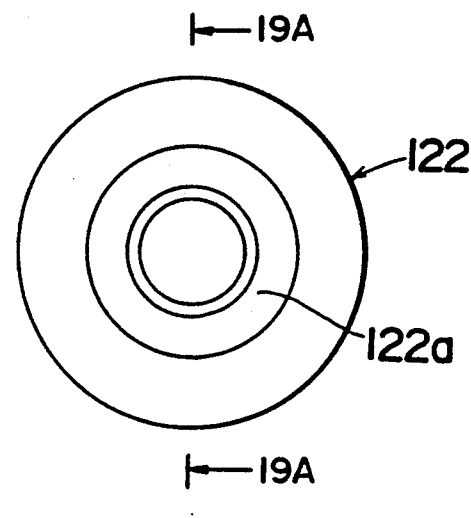
FIG. 19 is a side elevation of a second ring.
Figure 20A:
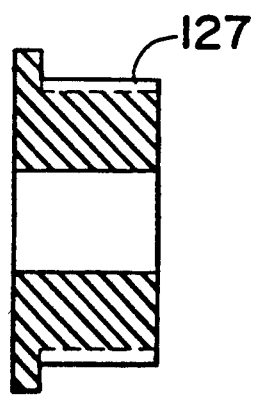
FIG. 20A is a sectional view taken along the line A—A in FIG. 20.
Figure 20:
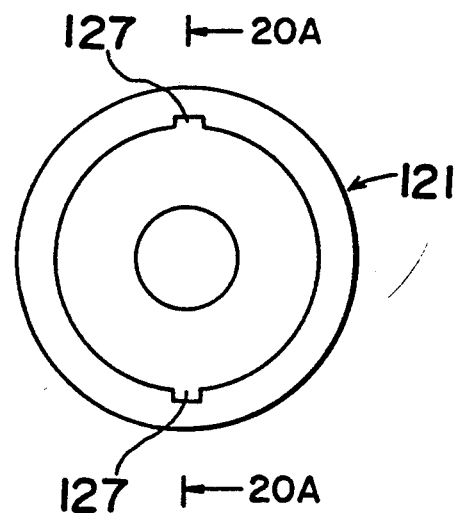
FIG. 20 is a side elevation of a first ring.

The stator 105 has the following construction. An iron core 120 is fixed to the fixed shaft 106 through first and second rings 121 and 122 being rubber vibration insulators. Coils 123 are wound around the iron core 120 so as to form three phases and six poles. As shown in FIG. 18, the fixed shaft 106 has a flange portion 124, a knurl portion 125 and an annular groove 126 which are formed in that order from the right-hand side of the drawing. A boss portion 122a of the second ring 122, shown in FIGS. 19 and 19A, is in contact with the flange portion 124 of the fixed shaft 106. The first ring 121 is provided with projections 127 as detent for the iron core 120 on its outer periphery. The projections 127 extend along the direction of the shaft 106 and are fitted in grooves 128 formed in the iron cores 120, as shown in FIG. 16. Inner peripheral surfaces of both rings 121 and 122 are attached to the knurl portion 125 of the fixed shaft 106 so that the rings 121 and 122 are stopped from rotating. A left-hand end face of the first ring 121 is in contact with a radially inside portion of an end face 131 of a resinous washer 130 having a very smooth surface, as shown in FIGS. 21 and 21A, so that improved insulation of vibration of the iron core 120 to be conducted to both rings 121 and 122 is obtained. Positioning of the washer 130 is effected by an E-type stop ring 132 fitted in the annular groove 126, as shown in FIG. 16.

Figure 17B:
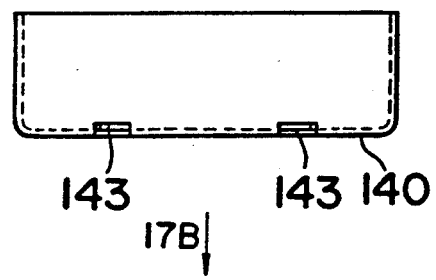
FIG. 17B is a view taken in the direction of the arrow B.
Figure 17A:
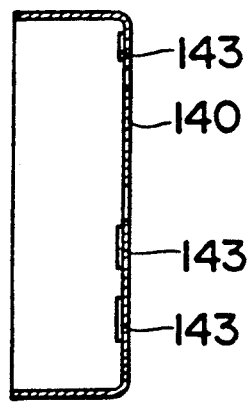
FIG. 17A is a sectional view taken along the line A—A of FIG. 17.
Figure 17:
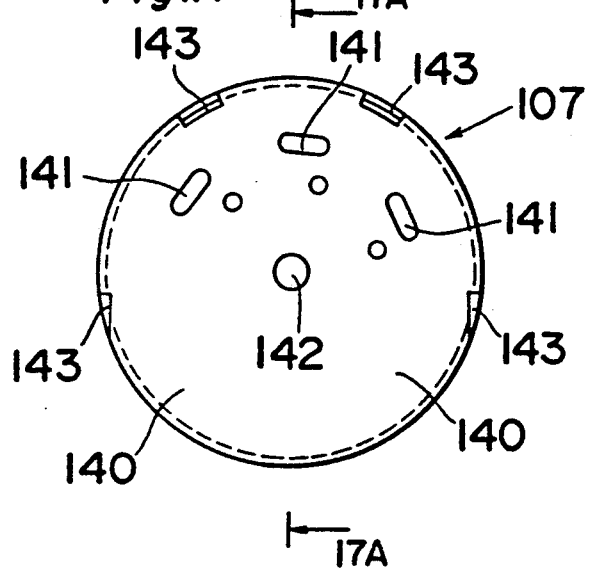
FIG. 17 is a side elevation of an end bracket.

The end bracket 107 is of the shape of a cup, as shown in FIGS. 17 and 17A, having a vertical area 140. The vertical area 140 of the end bracket 107 is provided with holes 141 for receiving the Hall elements H1-H3 and a further hole 142 for receiving a right-hand end portion of the fixed shaft 106. Also, notches 143 for inserting clips (described later) are provided on the edge of the vertical area 140 of the end bracket 107 at four points. The afore-mentioned printed circuit board P is fixed substantially in parallel with and opposite to the vertical area 140. The power transistors Q1-Q6 are installed so that their heat release surfaces are positioned along and parallel with the vertical area 140 of the end bracket 107.

The printed circuit board P is fitted to the end bracket 107 as shown in FIG. 16. In fitting of the printed circuit board P, elastic members 133 made of rubber are interposed between the printed circuit board P and the power transistors Q1-Q6, so that the the power transistors Q1-Q6 are tightly attached to the end bracket 107 by means of clips 134 made of leaf spring.

The elastic members 133 are disposed individually so as to correspond to the respective power transistors Q1-Q6. The clips 34 are provided in a peripheral portion of the printed circuit board P at regular intervals in a circumferential direction, at four places, for example.

The following describes in detail the rotor 104 which is a characteristic feature of the present invention.

The casing 114 of the rotor 104 which has a shape like a cup is formed by, for example, pressing a steel plate. The casing 114 includes, as shown in FIGS. 22-22B, a mounting area 150 and a cylindrical portion 151 which extends in an axial direction from the outer periphery of the mounting area 150. The mounting area 150 is provided with four screw holes 152 at regular intervals in a circumferential direction for receiving the screws 117 to fix members such as the coupling hub 185. The mounting area 150 is also provided with a flange portion 153 in the shape of a cylinder in its central portion. The flange portion 153 supports the ball bearing 111 on the right-hand side of FIG. 16.

The cylindrical portion 151 has 16 through-holes 154. The 16 through-holes 154 are arranged at regular intervals in a circumferential direction in two rows, eight in each row. As shown in FIG. 23, the annular yoke member 116 has semi-circular notches 155 at its opposite ends. The notches 155 are adapted to be aligned with the respective through-holes 154 when the yoke member 116 is fitted around the cylindrical portion 151. The notches 155 and the through-holes 154, when aligned, constitute openings 160 as shown in FIG. 16.

The annular spacer 118 (see FIG. 24) is disposed inside of the cylindrical portion 151 on the side of the mounting area 150 to cover the mounting area 150. The spacer 118 is made of a synthetic resin (nylon) being nonmagnetic material. An end face confronting the permanent magnet 115 of the spacer 118 has four recesses 156 disposed at regular intervals in a circumferential direction.

The permanent magnet 115, which has been molded and set adheres to an inner peripheral surface of the cylindrical portion 151. The permanent magnet 115 has projections 162 radially to be fitted in the openings 160 and small projections 157 axially to be fitted in the recesses 156 of the spacer 118, as shown in FIG. 16. The projections 162 and the small projections 157 allow the permanent magnet 115, the yoke member 116 and the spacer 118 to be monolithically fixed to the casing 114.

In the present embodiment, the openings 160 are constituted from the through-holes 154 of the casing 114 and the notches 155 of the yoke member 116. However, it is also possible to form through-holes in the yoke member 116 as well, in stead of the notches 155.

The following describes a production process of the permanent magnet 115 in the casing 114.

Figure 25:
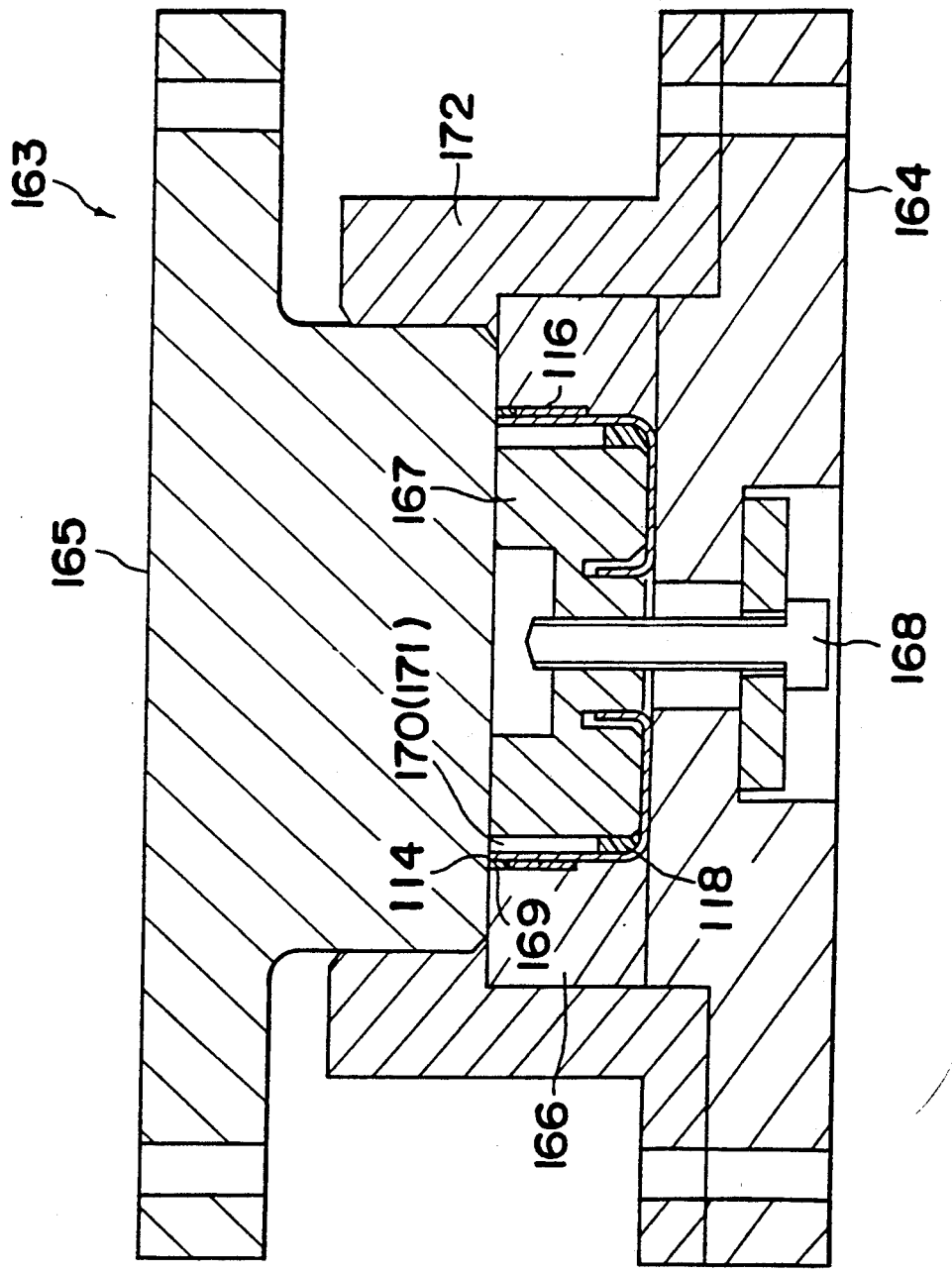
FIG. 25 is a longitudinal sectional view of a compression mold.

A compression mold 163 used to produce the permanent magnet 115 is shown in FIG. 25. The compression mold 163 includes an upper die 165 and a lower die 164. The casing 114 fitted with the yoke member 116 and the spacer 116 is held on the top of the lower die 164, sandwiched between an inner die 167 and an outer die 166. The inner die 167 is fastened to the lower die 164 by a fixing bolt 168. The outer die 166 is provided with a removable seal ring 169. Space 171 is formed between the casing 114 and the inner die 167.

A pasty mixed material of nonmagnetic powder, described later, and a binder material such as a thermosetting epoxy resin is made and poured into the space 171. After that, the upper die 165 is inserted into a cylindrical portion 172 of the lower die 164 and compressed downward in the figure. This compression process molds the mixed material into a shape filling the space 171 to form a molded piece 170. At the same time, this process forms the projections 162 and the small projections 157 integrally with the molded piece 170 because part of the mixed material is extruded into the openings 160 and the recesses 156 during the compression.

After the compression molding, the upper die 165 is raised and the outer die 166, the inner die 167 and the seal ring 169 are removed. Because these pieces 165, 166, 167 and 169 are coated with parting agent, the molded piece 170 remains adhering to the inside of the cylindrical portion 151. Next, the entire casing 114 is heated by a stove up to a setting temperature of the binder to set the binder.

The heating and setting process for the binder can be also performed in the following manner as well. After the compression molding in the mold 163 is completed, the entire mold 163 is heated while the compressed state is maintained. In this case, possible deformation occurring during the setting process can be avoided.

After the binder setting process, the casing 114 is processed by a magnetizing machine so that the molded piece 170 in the casing 114 is given four poles N, S, N and S in a circumferential direction to become the permanent magnet 115.

Figure 26:
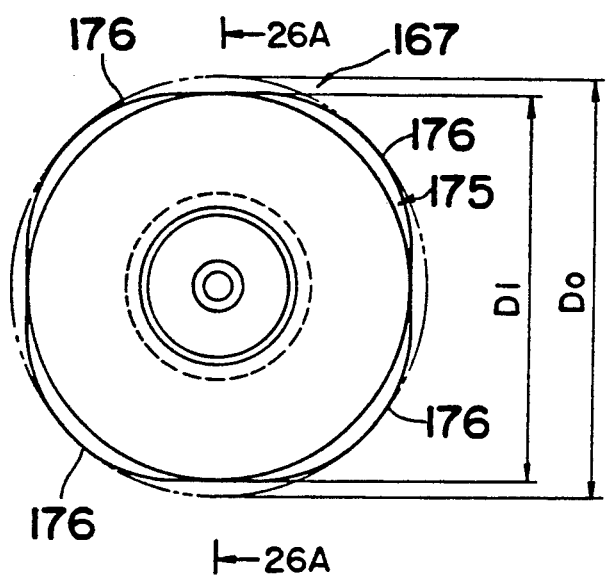
FIG. 26 is a plan view of an inner die.
Figure 26A:
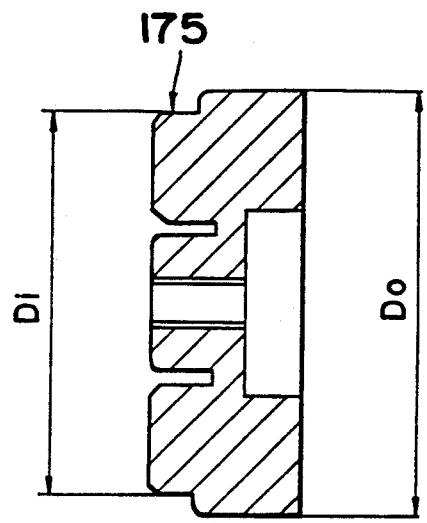
FIG. 26A is a cross sectional view taken along the line A—A of FIG. 26.
Figure 27A:
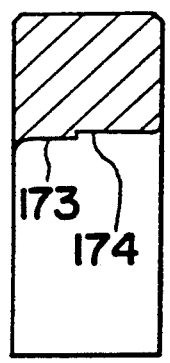
FIG. 27A is a cross sectional view taken along the line A—A of FIG. 27.
Figure 27:
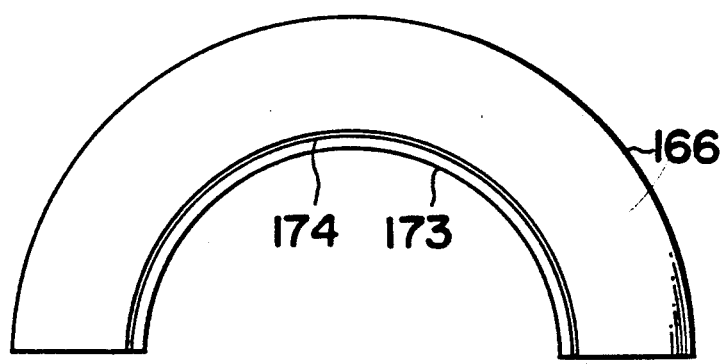
FIG. 27 is a plan view of an outer die.

As shown in FIGS. 27 and 27A, the outer die 166 is provided with a step portion 174 on its inner surface. The step portion 174 is used to receive the yoke member 116. As shown in FIGS. 26 and 26A, four sinusoidal planes 176 are formed in a mold surface 175 of the inner die 167. The sinusoidal planes 176 cause each of the poles of the permanent magnet 115 to have a cross section of the shape of a crescent. In this case, the sinusoidal planes 176 are set so that the following expression may be satisfied.

$$T = \{(D_o - D_i)/2\} \times \cos 2\theta$$

where T is a radial thickness of each of the magnetic poles, Do is a diameter of a large-diameter portion of the mold area 175 and Di is a diameter of a small-diameter portion of the mold area 175. Therefore, a radially internal shape of each magnetic pole portion is of a sinusoidal shape. This permits a rotary operation wherein rotation variability due to cogging at a switching position of each magnetic pole is decreased.

Rare-earth magnet powder consisting of neodymium, iron and boron is used as the magnetic powder material. Such a permanent magnet mold of rare-earth elements has the product of energy 3.6 times as large as that of a ferrite magnet which has been frequently used, and consequently, can be made much smaller in size to be one-third of a conventional magnet. When an amount of the binder is so small that a surface of the molded piece is not sufficiently covered, problems such as peeling, generation of rust, etc occur. On the other hand, when too much binder is mixed, because the product of energy per unit area reduces, and a surface layer increases in thickness, a rotary force decreases as when an air gap between the stator and the permanent magnet increases. For these reasons, a mixture ratio of the binder to the magnetic powder is about 2% by weight in the present embodiment to prevent such problems from occurring and to make the product of energy per unit area as large as possible.

In the present embodiment, the projections 162 of the permanent magnet 115 are fitted in the openings 160 so that the yoke member 116 is fixed to the casing 114. In addition, the small projections 157 of the permanent magnet 115 are fitted in the recesses 156 so that the spacer 118 is fixed to the casing 114. Therefore, it is possible to fix the yoke member 116 and the spacer 118 to the casing 114 at the same time during the molding process of the permanent magnet.

Figure 32:
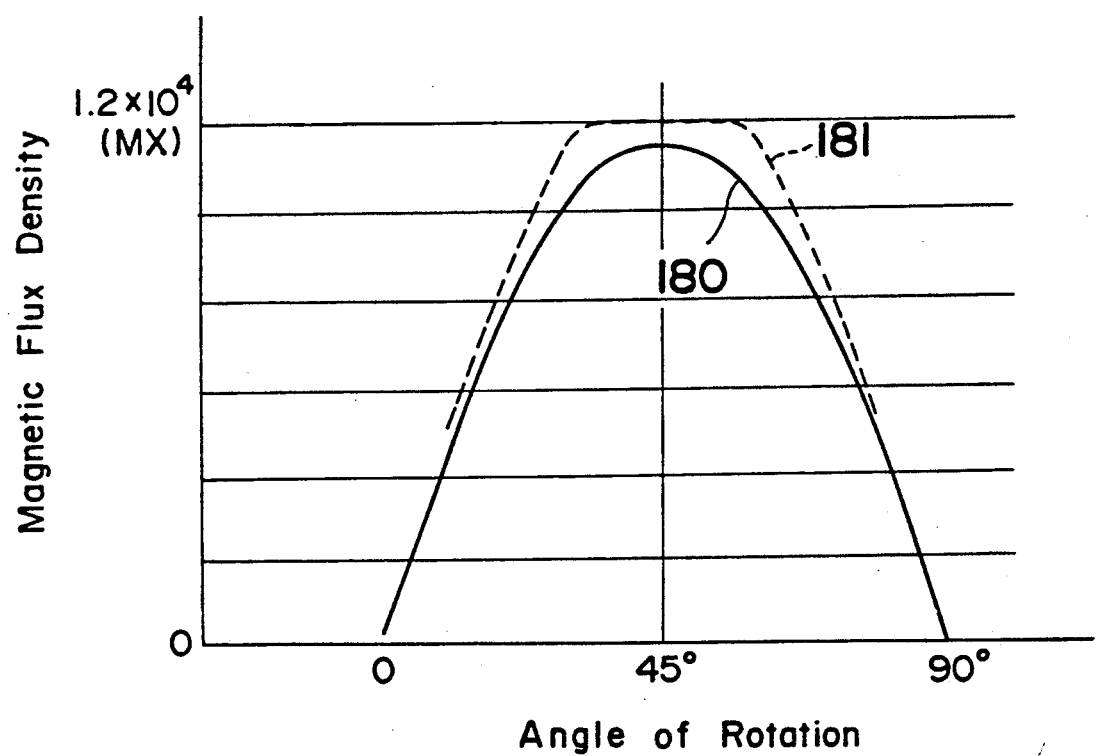
FIG. 32 is a graph indicating a change in magnetic flux density.

Because a cross section of each pole of the permanent magnet 115 is of a generally crescent shape, the magnetic flux density gently changes as indicated by a characteristic curve 180 in FIG. 32, as compared with a characteristic curve 181 of a conventional magnet. Therefore, the cogging in a switching position of each pole decreases.

The above embodiment can be modified such that the small projections 157 may be omitted. Furthermore, the shape, the number, the location, etc. of the openings 160 to receive the projections 162 of the magnet are not limited to the above but can be determined as desired. Moreover, though in the above embodiment, the invention is applied to a DC brushless motor wherein the permanent magnet 115 is provided in the rotor 104, the invention can be also applied to motors of a type wherein the permanent magnet is provided in the stator or of other types, and even to electric generators.

Fourth Embodiment

A fan apparatus according to a fourth embodiment of the present invention is shown in FIGS. 33–44.

Figure 33:
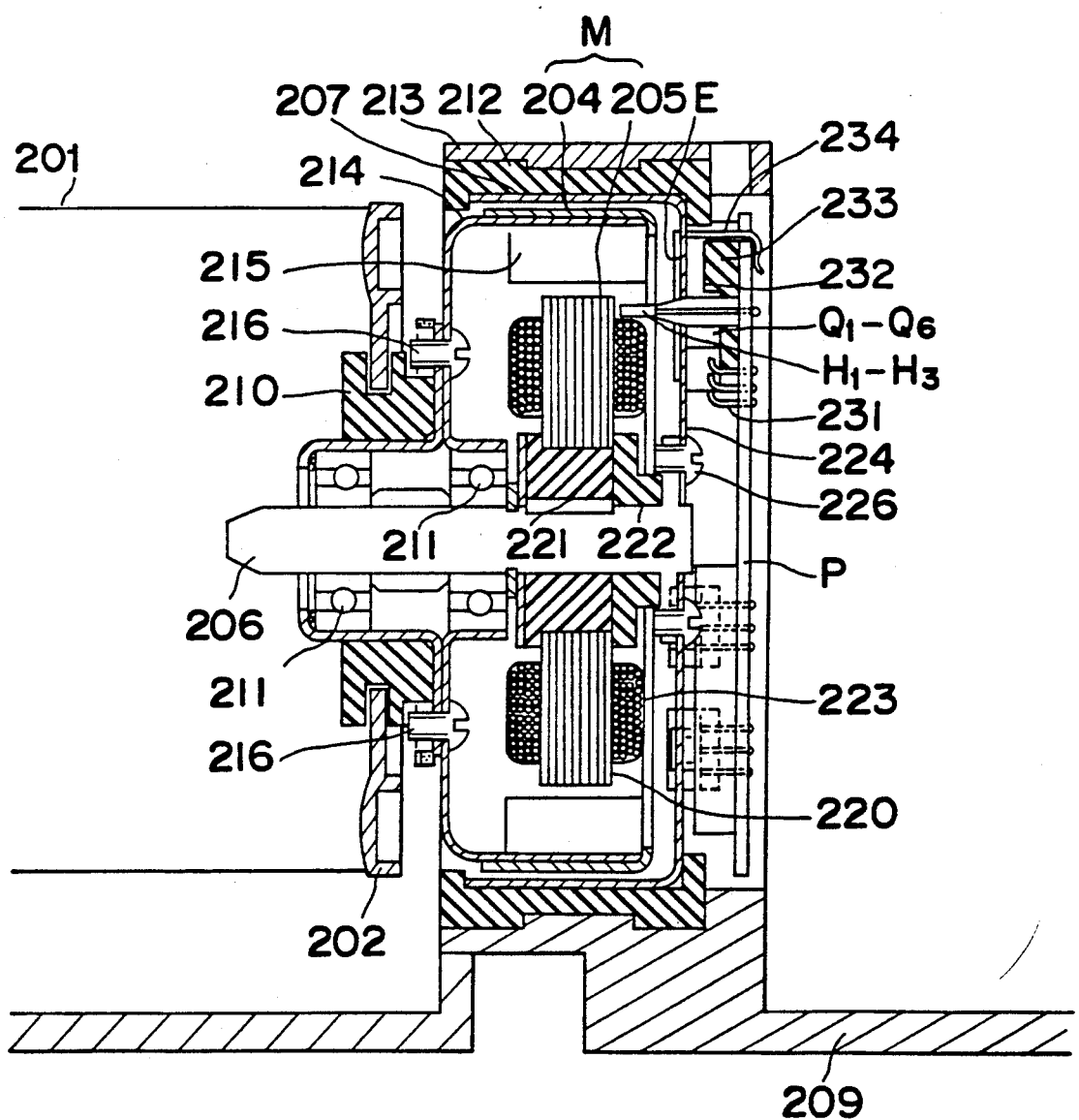
FIG. 33 is a fragmentary longitudinal sectional view of a fan apparatus according to a forth embodiment of the present invention.

Referring now to FIG. 33, there is shown a structure of a right-hand end portion of a cross-flow fan in an indoor unit of an air conditioner. A fan motor M of a DC brushless type is joined to a side plate 202 of a fan rotor 201. Specifically, a rotor 204 of the fan motor M is fixed to the side plate 202 through a flexible joint 210 being a rubber vibration insulator. The rotor 204 is rotatably supported around a fixed shaft 206 through two ball bearings 211. A stator 205 is fixed around the fixed shaft 206. The stator 205 constitutes the fan motor M together with the rotor 204. The fixed shaft 206 is supported by an end bracket 207 at an end on the right-hand side of the figure. The end bracket 207 is supported by a motor cover 213 and a frame 209 through a rubber vibration insulator 212. These members are adapted to support the fan motor M.

The motor cover 213 has a semicircular cross section in its top portion in the figure. This portion secures a space for containing a small-sized motor such as a drive motor for an air-direction regulating blades, for example.

There is disposed a printed circuit board P on the right of the end bracket 207, as described later in detail. The printed circuit board P is provided with six power transistors Q1–Q6 and three Hall elements H1–H3.

The rotor 204 is constructed so that a permanent magnet 215 is fixed to a generally cup-shaped casing 214. The casing 214 is joined to the flexible joint 210 with screws 216. The stator 205 is fixed to the fixed shaft 206 through first and second rings 221 and 222 being rubber vibration insulators. Coils 223 are wound around an iron core 220.

Figure 35:
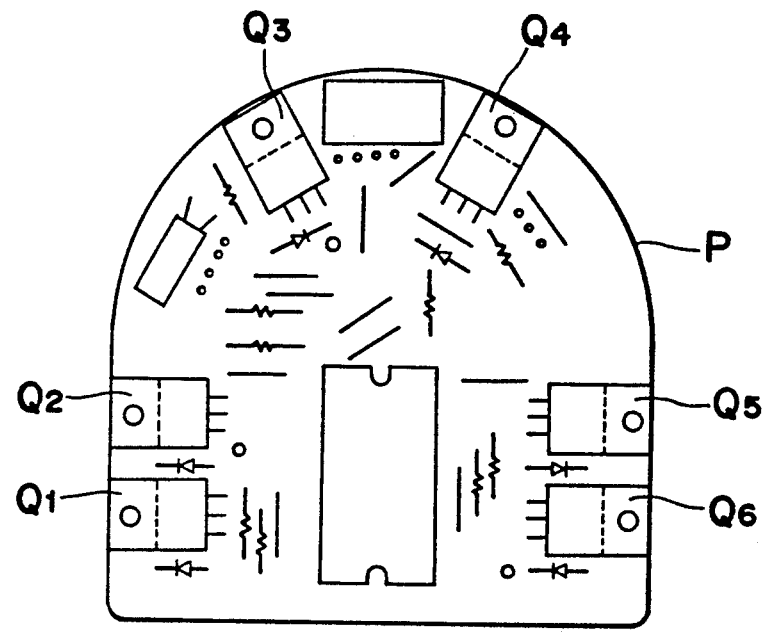
FIG. 35 is a side elevation of a printed circuit board.

The end bracket 207 is of the shape of a generally cup, as shown in FIGS. 34 and 34A, having a vertical area 224. The vertical area 224 of the end bracket 207 is provided with holes 225 for receiving the Hall elements H1–H3 and further holes 227 for receiving screws 226 to fix the end bracket 207 to the fixed shaft 206. Also, notches 228 are provided on the edge of the vertical area 224 of the end bracket 207 at four places, as shown in FIG. 34. The aforementioned printed circuit board P is fixed substantially in parallel with and opposite to the vertical area 224 of the end bracket. As shown in FIG. 35, the printed circuit board P has a semicircular shape in its upper portion so that the upper portion fits the motor cover 213, and a rectangular shape in its lower portion so that a sufficient space is secured and thus circuit elements such as the power transistors Q1–Q6, the Hall elements H1–H3, etc. can offer reliability.

Figure 36:
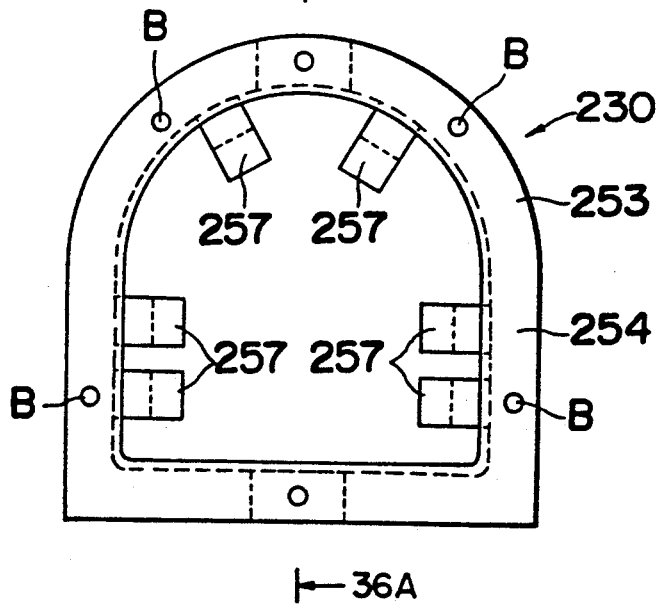
FIG. 36 is a side elevation of a jig.
Figure 36A:
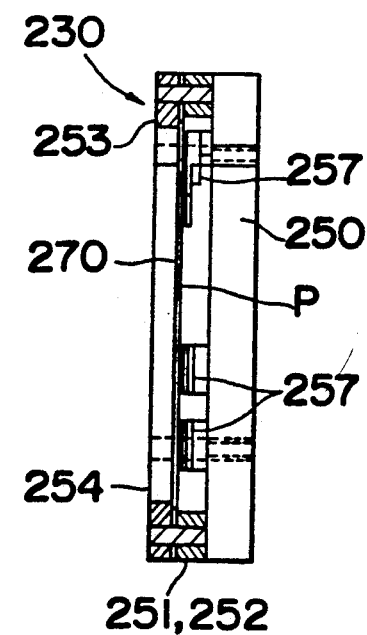
FIG. 36A is a cross sectional view taken along the line A—A in FIG. 36.

The power transistors Q1–Q6 are soldered on the board P in a manner that their heat release surfaces E are positioned along and parallel with the vertical area 224 of the end bracket 207. In a soldering process for the power transistors Q1–Q6, a jig 230 as shown in FIGS. 36 and 36A is used to maintain the heat release surfaces E substantially at the same level.

The printed circuit board P is fitted to the end bracket 207 with the aid of clips (clamping members) 234 made of leaf spring, for example, in a manner as shown in FIG. 33. As shown in FIG. 33, elastic members 233 made of rubber, for example, are disposed between the printed circuit board P and the power transistors Q1–Q6, so that the power transistors Q1–Q6 are pressed onto the end bracket 206 through the elastic members 233 when the printed circuit board P is mounted with the aid of the clips 234. Each of the elastic members 233 has a step portion 236 to adhere to a back surface 232 of each of the transistors Q1–Q6. The elastic members 233 are disposed individually to correspond to the respective power transistors Q1–Q6.

Figure 44A:
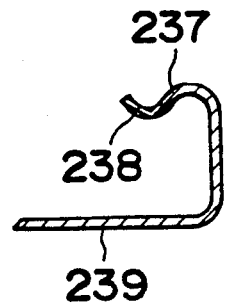
FIG. 44A is a cross sectional view taken along the line A—A of FIG. 44B.
Figure 44B:
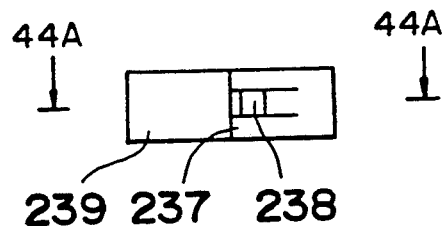
FIG. 44B is a view taken in the direction of the arrow B of FIG. 44.
Figure 44:
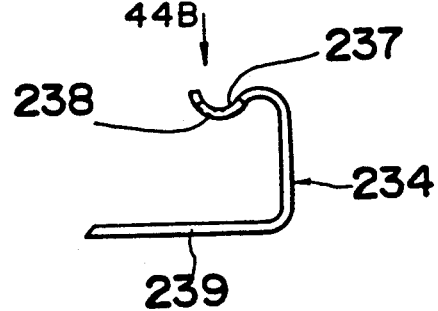
FIG. 44 is a front view of the clip.
Figure 43:
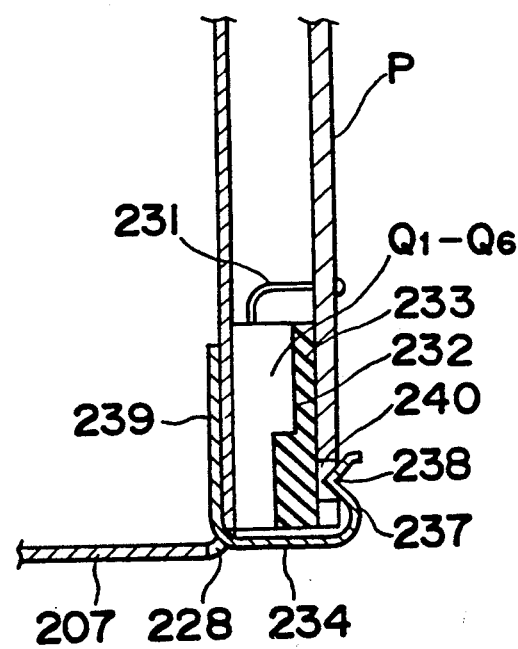
FIG. 43 is an enlarged sectional view of a portion held by a clip.

The clips 234 are provided in a peripheral portion of the printed circuit board P at regular intervals, at four places, for example. As shown in FIGS. 44 and 44B, each clip 234 is constituted from a generally U-shaped leaf spring, having an adhering portion 239 and a pressing portion 237 including a V-shaped protuberance 238. As shown in FIG. 43, the adhering portions 239 of the clips 234 are inserted into the end bracket 207 through the respective notches 228 of the end bracket 207 and clamp the end bracket 207 so that the clips 234 clamp the printed circuit board P by means of their spring force. At this time, the adhering portion 239 of each clip 234 adheres to the end bracket 207 while the V-shaped protuberance 238 is fit in the hole 240 of the printed circuit board P.

The following describes a structure of the soldering jig 230 and its usage.

Figure 37:
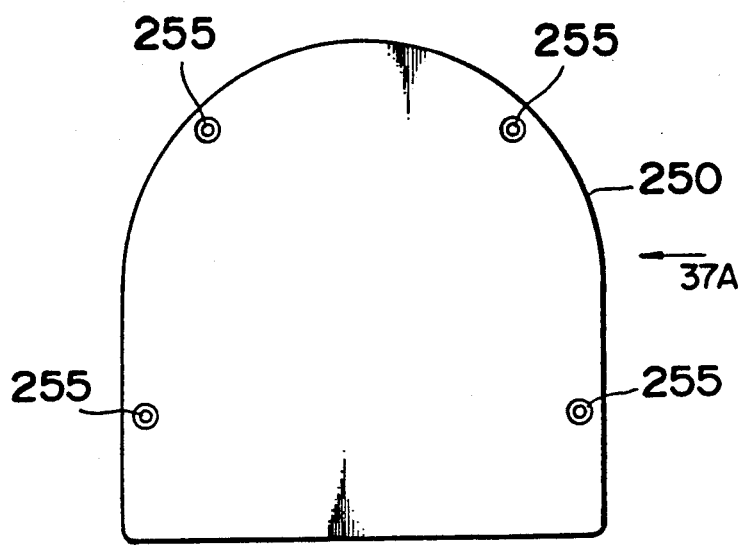
FIG. 37 is a side elevation of a flat plate.
Figure 37A:
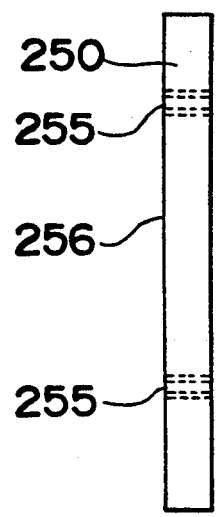
FIG. 37A is a view taken in the direction of the arrow A of FIG. 37.
Figure 38B:
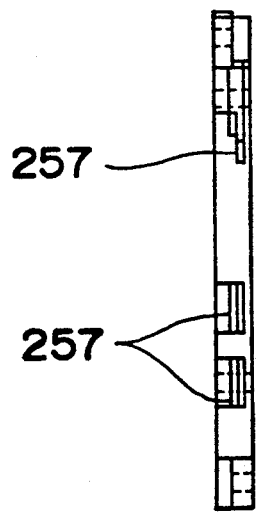
FIG. 38B is a view taken in the direction of the arrow B of FIG. 38.
Figure 38:
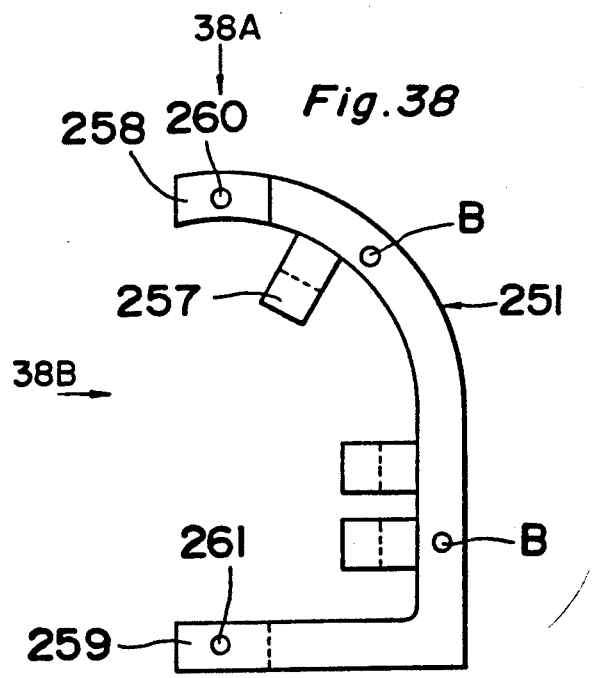
FIG. 38 is a side elevation of a right spacer.
Figure 38A:
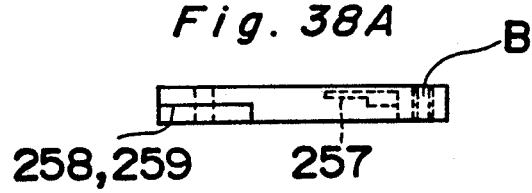
FIG. 38A is a view taken in the direction of the arrow A of FIG. 38.
Figure 41:
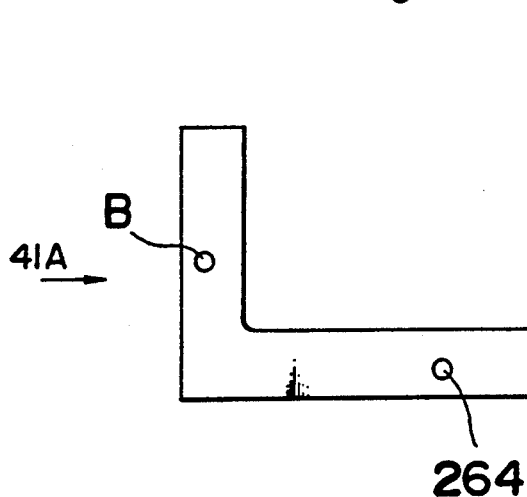
FIG. 41 is a side elevation of a lower press plate.
Figure 41A:
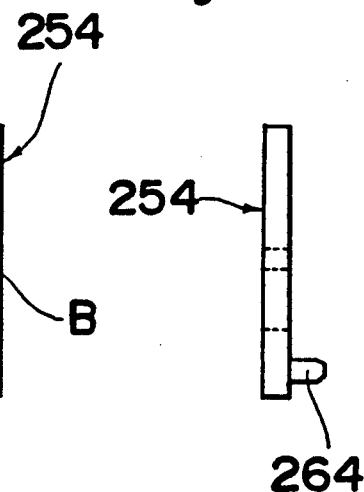
FIG. 41A is a view taken in the direction of the arrow A of FIG. 41.
Figure 42A:
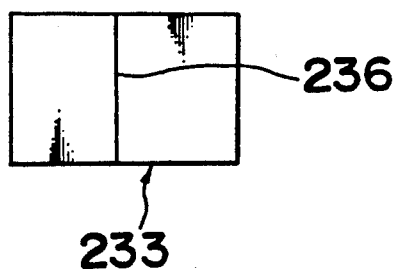
FIG. 42A is a view taken in the direction of the arrow A of FIG. 42.
Figures 42, 42B:
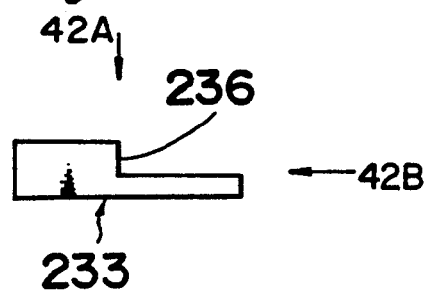
FIG. 42 is a side elevation of an elastic member.
FIG. 42B is a view taken in the direction of the arrow B of FIG. 42.

As shown in FIG. 36A, the jig 230 is constituted from a flat plate 250, right and left spacers 251 and 252, and upper and lower press plates 253 and 254. The flat plate 250 has a shape corresponding to the printed circuit board P, as shown in FIGS. 37 and 37A. Four screw holes 255 are formed in a peripheral portion of the plate plate 250. The heat release surfaces E of the power transistors Q1–Q6 are brought into contact with a reference surface 256 of the flat plate 250. The right and left spacers 251 and 252 are constructed as shown in FIGS. 38–38B and FIGS. 39–39B. The right and left spacers 251 and 252 are respectively provided with stepped projections 257 to press the back surfaces 232 of the power transistors Q1–Q6. Both spacers 251 and 252 are connected to each other by overlapping their fitting portions 258 and 259 each other so that a positioning hole in the fitting portion 258 meets a positioning hole 261 in the fitting portion 259. The spacers 251 and 252 each have two bolt holes B. The upper press plate 253 has a shape like a semicircle's arc, as shown in FIGS. 40 and 40A. The upper press plate 253 has a pin 262 to be fitted in the positioning holes 260 of the right and left spacers 251 and 252 in its central portion, and two bolt holes B on both sides of the pin 262. On the other hand, the lower press plate 254 is generally U-shaped, as shown in FIGS. 41 and 41A. This lower press plate 254 has a pin 264 to be fitted in the positioning holes 261, and two bolt holes B.

The jig 230 with the above structure is used in the following manner.

First, the printed circuit board P is placed in the jig 230 in a state that heat release surfaces E of the power transistors Q1–Q6 are in contact with the reference surface 256 of the flat plate 250. Then, the right spacer 251 and the left spacer 252 are inserted between the printed circuit board P and the reference surface 256 from the right and left, respectively. Assembly of the spacers 251 and 252 are done while adjusting positions of the power transistors Q1–Q6 such that the stepped projections 257 of the spacers 251 and 252 are engaged with the back surfaces of the power transistors Q1–Q6. When the spacers 251 and 252 have been assembled, the positioning holes 61, 62 of the spacer 251 meet those 61, 62 of the spacer 252. After that, the upper and lower press plates 253 and 254 are mounted on the solder surface 270 side of the printed circuit board P to sandwich the printed board P along with the assembled right and left spacers 251 and 252. At this time, the pins 262 and 264 of the upper and lower press plates 253 and 254 are fitted in the positioning holes 260 and 261, and bolts (not shown) are inserted through the bolt holes B into the screw holes 255 of the flat plate 250. The solder surface 270 of the printed circuit board P in the above assemble state is dipped in a solder reservoir and soldered. Accordingly, the heat release surfaces of the power transistors Q1–Q6 are kept at substantially the same level. As a result, in the process for assembling the printed circuit board P equipped with the power transistors, etc. in the fan apparatus, damage to solder-surface-side foil on lead wires 231 of the power transistors Q1–Q6 is avoided.

The following describes the operation of the apparatus as constructed above.

The printed circuit board P is clipped to the end bracket 207 by the clips 234, with the elastic members 233 interposed between the power transistors Q1–Q6 and the board P. In this case, each of the power transistors Q1–Q6 is brought into contact with the end bracket 207 by a pressing force which acts on the power transistors Q1–Q6 uniformly, unlike prior art wherein the power transistors Q1–Q6 are pressed locally. Therefore, adhesion of the heat release surfaces E of the power transistors Q1–Q6 to the end bracket 207 is improved, and the power transistors Q1–Q6 can offer an improved heat release efficiency.

The only four clips 234 provided at regular intervals in the circumferential portion of the printed circuit board P are enough to hold the power transistors Q1–Q6, pressing them with almost uniform force to the end bracket 207. Therefore, it is not necessary to provide clips corresponding individually to the power transistors Q1–Q6. Namely, a smaller number of clips are required, as compared with prior art.

In the present embodiment, the clip 234 is provided with the V-shaped protuberance 238, which is, however, not essential. The configuration of the printed circuit board can, of course, be modified as desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing an electric motor wherein a casing made of a magnetic material for a part of the motor selected from the group consisting of a rotor or a stator, includes a mounting area perpendicularly intersecting a rotary shaft, and a cylindrical portion axially extending from an outer edge of the mounting area, and wherein an annular permanent magnet is circumferentially disposed along an inner circumferential surface of the cylindrical portion, comprising the steps of:

(a) pouring a mixture of magnetic power and a binder into the casing;
(b) compression-molding the mixture into an annular shape fitting the inner circumferential surface of the cylindrical portion to form a molded piece;
(c) curing the binder in the molded piece;
(d) magnetizing the molded piece to form a permanent magnet;
(e) forming a separating member composed of a nonmagnetic material for magnetically separating the mounting area from the permanent magnet;
(f) forming concave or convex engagement portions on an end face of the separating member; and
(g) mounting the separating member to the mounting area in a manner that the other end face of the separating member is in contact with the mounting area;

wherein the pouring and compression-molding steps follow the mounting step to provide an end face of the molded piece with a configuration fitting the engagement portions of the separating member.

2. The method as claimed in claim 1, wherein convex molding portions are formed on a molding surface of a compression mold used in the compression-molding step to provide the other end face of the molded piece with portions for mounting counterbalances.

3. The method as claimed in claim 1, wherein the magnetic powder is composed of rare-earth elements.

4. An electric motor comprising:

a rotor having a plurality of poles;
a stator having a plurality of poles confronting the poles of the rotor in a radial direction;
a permanent magnet which is composed of magnetic power and a binder being a thermosetting resin and which constitutes poles selected from the group consisting of poles of the rotor or poles of the stator, the permanent magnet having projections on one end face in an axial direction and recesses on the other end face;
a generally cup-shaped casing made of a magnetic material and having a vertical portion and a cylindrical portion which extends in an axial direction from an edge of the vertical portion for accommodating the permanent magnet along an inner circumference of the cylindrical portion in a circumferential direction; and
a nonmagnetic separating member which is disposed between the vertical portion of the casing and the permanent magnet along another circumference of the cylindrical portion of the casing so that the vertical portion of the casing is magnetically insulated from the permanent magnet, the separating member having recesses to receive the projections of the permanent magnet on one end face.

5. The electric motor as claimed in claim 4, wherein the magnetic powder is composed of rare-earth elements, and a mixture ratio of the binder to the magnetic powder is 5 to 10% by weight.

6. An electric rotary machine comprising:

a rotor having a plurality of poles;
a stator having a plurality of poles confronting the poles of the rotor in a radial direction;
a permanent magnet which is composed of magnetic power and a binder being a thermosetting resin and which constitutes poles selected from the group consisting of a rotor or the poles of the stator;
a casing having a cylindrical portion which extends in an axial direction for accommodating the permanent magnet along an inner circumference of the cylindrical portion in a circumferential direction;
a yoke member which is mounted around an outer circumference of the cylindrical portion of the casing;
a plurality of openings which penetrate the cylindrical portion and the yoke member at the same time; and
a plurality of projections to be fitted in the openings, the projections being monolithically formed on an outer circumference of the permanent magnet.

7. The electric rotary machine as claimed in claim 6, wherein the magnetic powder is composed of rare-earth elements.

8. An electric rotary machine comprising:

a rotor having a plurality of poles;
a stator having a plurality of poles confronting the poles of the rotor in a radial direction;
a permanent magnet which is composed of magnetic power and a binder being a thermosetting resin and which constitutes poles selected from the group consisting of the rotor or poles of the stator;
a casing having a cylindrical portion which extends in an axial direction for accommodating the permanent magnet along an inner circumference of the cylindrical portion in a circumferential direction;
a yoke member which is mounted around an outer circumference of the cylindrical portion of the casing;
a plurality of openings which penetrate the cylindrical portion and the yoke member at the same time;
a plurality of projections to be fitted in the openings, the projections being monolithically formed on an outer circumference of the permanent magnet; and
wherein the casing has a vertical mounting portion and the cylindrical portion to be generally cup-shaped, the permanent magnet has projections on one end face in an axial direction, a separating member made of a nonmagnetic material is disposed between the vertical portion of the casing and the permanent magnet along an outer circumference of the cylindrical portion of the casing so that the vertical portion of the casing is magnetically insulated from the permanent magnet, and the separating member has recesses to receive the projections provided on said one end face of the permanent magnet.

9. A method for producing an electric rotary machine wherein poles provided in a rotor confronting poles provided in a stator, and poles selected from the group consisting of the poles of the rotor or the poles of the stator are constituted from a permanent magnet, comprising the steps of:
- (a) forming a casing of a nonmagnetic material for the rotor or the stator so that the casing has cylindrical portion extending in an axial direction for mounting the permanent magnet;
- (b) forming a plurality of openings in the cylindrical portion and a yoke member to be fitted around the cylindrical portion;
- (c) arranging the cylindrical portion of the casing and the yoke member so that the openings of the cylindrical portion and the openings of the yoke member are radially aligned when the yoke member is mounted around the cylindrical portion;
- (d) fitting a generally ring-shaped nonmagnetic spacer onto an inner surface of the vertical area so that an outer circumferential surface of the spacer is in contact with an inner circumferential surface of the cylindrical portion of the casing;
- (e) pouring a mixture of magnetic power and a binder inside the cylindrical portion along an inner surface of the cylindrical portion as well as in the openings;
- (f) compression-molding the mixture to form a molded piece;
- (g) curing the binder;
- (h) magnetizing the molded piece to form a permanent magnet; and
- (i) forming a vertical mounting area to continue from the cylindrical portion in a manner that the vertical mounting area intersects a shaft substantially at right angles;

10. The method as claimed in claim 9, wherein the spacer has recesses on one end face to receive part of the permanent magnet.

11. A fan apparatus having a fan motor, an end bracket for supporting the fan motor, and a circuit board equipped with heat generation elements and disposed in opposition to the end bracket, wherein:
   the heat generation elements are disposed in a peripheral portion of the circuit board;
   a heat release surface of each heat generation element is in contact with the end bracket;
   elastic members are disposed between the end bracket and the respective heat generation elements; and
   clamping members made of generally U-shaped elastic pieces are provided to clamp the end bracket and the circuit board so that the heat release surfaces of the heat generation elements are held in close contact with the end bracket.

12. The fan apparatus claimed in claim 11, wherein each clamping member has an adhering portion to adhere to an inner surface of the end bracket and a pressing portion having a V-shaped protuberance to press the circuit board toward the end bracket, and the adhering portion is inserted in the end bracket through a notch provided on the end bracket to adhere to the inner surface of the end bracket and the V-shaped protuberance is fitted in a hole bored in the circuit board.

13. A fan apparatus as claimed in claim 11, wherein the number of the clamping members is, smaller than the number of the heat generation elements.

* * * * *